(12) United States Patent
Aoi et al.

(10) Patent No.: US 12,366,763 B2
(45) Date of Patent: Jul. 22, 2025

(54) LENS DEVICE, IMAGING APPARATUS, OPERATION METHOD OF LENS DEVICE, OPERATION METHOD OF IMAGING APPARATUS, AND PROGRAM

(71) Applicant: FUJIFILM Corporation, Tokyo (JP)

(72) Inventors: Toshihiro Aoi, Saitama (JP); Taro Asami, Saitama (JP); Shinichi Shimotsu, Saitama (JP); Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 180 days.

(21) Appl. No.: 18/337,033

(22) Filed: Jun. 18, 2023

(65) Prior Publication Data
US 2023/0333401 A1 Oct. 19, 2023

Related U.S. Application Data

(63) Continuation of application No. PCT/JP2021/040168, filed on Oct. 29, 2021.

(30) Foreign Application Priority Data

Dec. 25, 2020 (JP) ................................. 2020-217840

(51) Int. Cl.
G02B 27/64 (2006.01)
H04N 23/54 (2023.01)
(Continued)

(52) U.S. Cl.
CPC ........... *G02B 27/646* (2013.01); *H04N 23/54* (2023.01); *H04N 23/55* (2023.01); *H04N 23/683* (2023.01); *H04N 23/687* (2023.01)

(58) Field of Classification Search
USPC ......................................................... 396/55
See application file for complete search history.

(56) References Cited

U.S. PATENT DOCUMENTS

| 2014/0186017 A1 | 7/2014 | Shibata |
| 2018/0198971 A1 | 7/2018 | Watanabe |

(Continued)

FOREIGN PATENT DOCUMENTS

| JP | 2000013670 | 1/2000 |
| JP | 2004354714 | 12/2004 |

(Continued)

OTHER PUBLICATIONS

"International Search Report (Form PCT/ISA/210) of PCT/JP2021/040168", mailed on Jan. 25, 2022, with English translation thereof, pp. 1-5.

(Continued)

*Primary Examiner* — Clayton E. LaBalle
*Assistant Examiner* — Warren K Fenwick
(74) *Attorney, Agent, or Firm* — JCIPRNET

(57) ABSTRACT

Provided is a lens device provided in an imaging apparatus body including an image sensor, the lens device including a processor, a a memory coupled to or integrated with the processor, a lens that includes a movement lens and that images incident light on the image sensor, and a drive mechanism that moves the movement lens by applying power to the movement lens along a coordinate plane intersecting an optical axis of the lens. The processor is configured to perform, with respect to the drive mechanism, control of changing a movement amount of the movement lens based on a wavelength range of the light transmitted through the movement lens.

18 Claims, 19 Drawing Sheets

(51) Int. Cl.
  *H04N 23/55*     (2023.01)
  *H04N 23/68*     (2023.01)

(56) References Cited

U.S. PATENT DOCUMENTS

| | | | |
|---|---|---|---|
| 2019/0377166 A1* | 12/2019 | Komatsu | G02B 15/173 |
| 2023/0333399 A1* | 10/2023 | Shimotsu | G02B 27/646 |
| 2023/0333400 A1* | 10/2023 | Tanaka | H04N 23/663 |
| 2024/0323542 A1* | 9/2024 | Yanagisawa | H04N 23/698 |

FOREIGN PATENT DOCUMENTS

| | | |
|---|---|---|
| JP | 2014021349 | 2/2014 |
| JP | 2014126860 | 7/2014 |
| JP | 2017044878 | 3/2017 |
| JP | 2018112605 | 7/2018 |
| WO | WO-2020022026 A1 * | 1/2020 |

OTHER PUBLICATIONS

"Written Opinion of the International Searching Authority (Form PCT/ISA/237) of PCT/JP2021/040168", mailed on Jan. 25, 2022, with English translation thereof, pp. 1-8.

"Office Action of Japan Counterpart Application", issued on Apr. 1, 2025, with English translation thereof, p. 1-p. 6.

* cited by examiner

| OPTICAL FILTER NAME | RANGE |
|---|---|
| Ir CUT FILTER | - |
| FIRST BPF | 1000 nm |
| SECOND BPF | 1250 nm |
| THIRD BPF | 1550 nm |
| FOURTH BPF | 2150 nm |

LENS DEVICE, IMAGING APPARATUS, OPERATION METHOD OF LENS DEVICE, OPERATION METHOD OF IMAGING APPARATUS, AND PROGRAM

CROSS-REFERENCE TO RELATED APPLICATIONS

This application is a continuation application of International Application No. PCT/JP2021/040168, filed Oct. 29, 2021, the disclosure of which is incorporated herein by reference in its entirety. Further, this application claims priority under 35 USC 119 from Japanese Patent Application No. 2020-217840 filed Dec. 25, 2020, the disclosure of which is incorporated by reference herein.

BACKGROUND OF THE INVENTION

1. Field of the Invention

The technology of the present disclosure relates to a lens device, an imaging apparatus, an operation method for a lens device, an operation method for an imaging apparatus, and a program.

2. Description of the Related Art

JP2017-44878A discloses an imaging apparatus comprising an imaging unit that images a subject through an imaging optical system, first and second image shake correction units that correct an image shake of an image of the subject, a control unit that performs control of correcting the image shake by acquiring a detection signal of the shake and controlling the first and second image shake correction units, and performs control of pixel shift for acquiring a plurality of images by the imaging unit while moving the first or second image shake correction unit or the first and second image shake correction units.

JP2014-21349A discloses an image acquisition method by an imaging apparatus in which a lens group constituting an imaging lens or at least a part of the lens is defined by a movable lens group and the imaging apparatus is configured to move the movable lens group by a control unit to have a component in a direction orthogonal to an optical axis, the image acquisition method including a step of acquiring two or more images having different positions of the optical axis on an imaging surface of an imaging element by moving the movable lens group to shift the optical axis of the imaging lens on the imaging surface, and a step of combining the two or more images to generate one image.

JP2000-13670A discloses an imaging apparatus comprising an imaging unit, a shake detection unit that detects a shake, an image shake correction unit that corrects an image shake based on output of the shake detection unit, a pixel shift unit that finely displaces a position of an image on the imaging unit by using the image shake correction unit, an image combining unit combines high-resolution images based on a plurality of image data captured by displacing the position of the image on the imaging unit by the pixel shift unit, and a control unit that is able to select a first imaging mode for correcting the image shake and a second imaging mode for combining the high-resolution images and changes drive control of the image shake correction unit by the selected imaging mode.

SUMMARY OF THE INVENTION

One embodiment according to the technology of the present disclosure relates to a lens device, an imaging apparatus, an operation method for a lens device, an operation method for an imaging apparatus, and a program capable of moving a movement lens by a movement amount according to a wavelength range of light transmitted through the movement lens, for example.

A first aspect according to the technology of the present disclosure relates to a lens device provided in an imaging apparatus body including an image sensor, the lens device comprising a processor, a a memory coupled to or integrated with the processor, a lens that includes a movement lens and that images incident light on the image sensor, and a drive mechanism that moves the movement lens by applying power to the movement lens along a coordinate plane intersecting an optical axis of the lens, in which the processor is configured to perform, with respect to the drive mechanism, control of changing a movement amount of the movement lens based on a wavelength range of the light transmitted through the movement lens.

A second aspect according to the technology of the present disclosure relates to the lens device according to the first aspect, further comprising a first lens, a second lens, a first drive mechanism that moves the first lens along the coordinate plane, and a second drive mechanism that moves the second lens along the coordinate plane, in which at least one of the first lens or the second lens is the movement lens.

A third aspect according to the technology of the present disclosure relates to the lens device according to the second aspect, in which the processor is configured to perform, with respect to the first drive mechanism, control of moving the first lens in a direction in which a shake of an image obtained by imaging the light on the image sensor is corrected, and perform, with respect to the second drive mechanism, control of moving the second lens in a direction for shifting the image.

A fourth aspect according to the technology of the present disclosure relates to the lens device according to the third aspect, in which the processor is configured to perform, with respect to the second drive mechanism, control of moving the second lens to a position at which the image is shifted at a pitch equal to or larger than a pixel pitch of the image sensor or a pitch smaller than the pixel pitch of the image sensor.

A fifth aspect according to the technology of the present disclosure relates to the lens device according to the third or fourth aspect, in which a shift amount of the image on a light-receiving surface of the image sensor with respect to movement of the second lens in a unit movement amount is smaller than a shake correction amount of the image on the light-receiving surface of the image sensor with respect to movement of the first lens in the unit movement amount.

A sixth aspect according to the technology of the present disclosure relates to the lens device according to any one of the third to fifth aspects, in which, in a case in which a shift amount of a central ray passing through the second lens after movement on the optical axis on a light-receiving surface of the image sensor with respect to movement of the second lens in a unit movement amount is denoted by S1 and a shift amount of a peripheral ray passing through the second lens after movement on a region other than the optical axis on the light-receiving surface of the image sensor with respect to movement of the second lens in the unit movement amount, is denoted by S2, a relationship of $0.8 \leq S2/S1 \leq 1.2$ is established.

A seventh aspect according to the technology of the present disclosure relates to the lens device according to any one of the second to sixth aspects, further comprising a zoom lens, in which the first lens and the second lens are disposed on an image sensor side with respect to the zoom lens.

An eighth aspect according to the technology of the present disclosure relates to the lens device according to any one of the second to sixth aspects, further comprising an optical filter that is disposed on a subject side with respect to the image sensor and transmits near-infrared light included in the light.

A ninth aspect according to the technology of the present disclosure relates to the lens device according to any one of the second to eighth aspects, further comprising a focus lens, in which the first lens and the second lens are disposed on an image sensor side with respect to the focus lens.

A tenth aspect according to the technology of the present disclosure relates to the lens device according to any one of the second to ninth aspects, further comprising a stop, in which the first lens and the second lens are disposed on an image sensor side with respect to the stop.

An eleventh aspect according to the technology of the present disclosure relates to the lens device according to any one of the first to tenth aspects, further comprising a switching mechanism that switches the wavelength range of the light transmitted through the movement lens.

A twelfth aspect according to the technology of the present disclosure relates to the lens device according to any one of the first to eleventh aspects, further comprising a light separation mechanism that separates the light into first light and second light, a first optical lens through which the first light is transmitted, and a second optical lens through which the second light is transmitted, in which at least one of the first optical lens or the second optical lens is the movement lens.

A thirteenth aspect according to the technology of the present disclosure relates to an imaging apparatus comprising a processor, a a memory coupled to or integrated with the processor, an image sensor, a lens that includes a movement lens and that images incident light on the image sensor, and a drive mechanism that moves the movement lens by applying power to the movement lens along a coordinate plane intersecting an optical axis of the lens, in which the processor is configured to perform, with respect to the drive mechanism, control of changing a movement amount of the movement lens based on a wavelength range of the light transmitted through the movement lens.

A fourteenth aspect according to the technology of the present disclosure relates to the imaging apparatus according to the thirteenth aspect, in which the processor is configured to perform, with respect to the drive mechanism, control of moving the movement lens to a position at which an image obtained by imaging the light on the image sensor is shifted at a pitch equal to or larger than a pixel pitch of the image sensor or a pitch smaller than the pixel pitch of the image sensor, cause the image sensor to perform imaging each time the image is shifted, and combine images of a plurality of frames obtained by the imaging.

A fifteenth aspect according to the technology of the present disclosure relates to an operation method for a lens device including a lens that includes a movement lens and that images incident light on an image sensor of an imaging apparatus body, and a drive mechanism that moves the movement lens by applying power to the movement lens along a coordinate plane intersecting an optical axis of the lens, the operation method comprising performing, with respect to the drive mechanism, control of changing a movement amount of the movement lens based on a wavelength range of the light transmitted through the movement lens.

A sixteenth aspect according to the technology of the present disclosure relates to an operation method for an imaging apparatus including an image sensor, a lens that includes a movement lens and that images incident light on the image sensor, and a drive mechanism that moves the movement lens by applying power to the movement lens along a coordinate plane intersecting an optical axis of the lens, the operation method comprising performing, with respect to the drive mechanism, control of changing a movement amount of the movement lens based on a wavelength range of the light transmitted through the movement lens.

A seventeenth aspect according to the technology of the present disclosure relates to a non-transitory computer-readable storage medium storing a program that is executable by a computer applied to a lens device including a lens that includes a movement lens and that images incident light on an image sensor of an imaging apparatus body, and a drive mechanism that moves the movement lens by applying power to the movement lens along a coordinate plane intersecting an optical axis of the lens, the program causing the computer to execute a process comprising performing, with respect to the drive mechanism, control of changing a movement amount of the movement lens based on a wavelength range of the light transmitted through the movement lens.

An eighteenth aspect according to the technology of the present disclosure relates to a non-transitory computer-readable storage medium storing a program that is executable by a computer applied to an imaging apparatus including an image sensor, a lens that includes a movement lens and that images incident light on the image sensor, and a drive mechanism that moves the movement lens by applying power to the movement lens along a coordinate plane intersecting an optical axis of the lens, the program causing the computer to execute a process comprising performing, with respect to the drive mechanism, control of changing a movement amount of the movement lens based on a wavelength range of the light transmitted through the movement lens.

DESCRIPTION OF THE PREFERRED EMBODIMENTS

Figure 1:
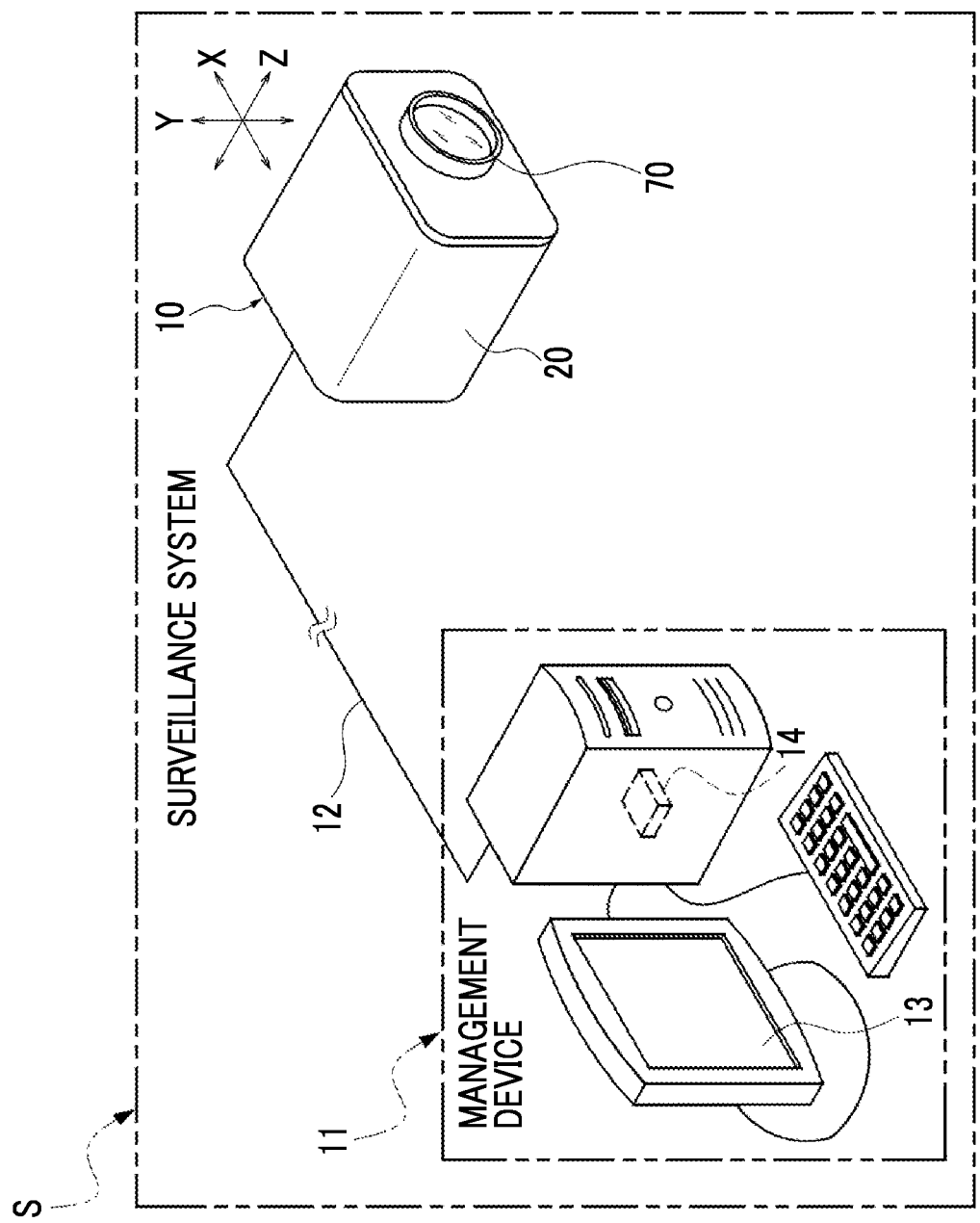
FIG. 1 is a perspective view showing an example of a configuration of a surveillance system according to one embodiment of the technology of the present disclosure.

Hereinafter, examples of embodiments of a lens device, an imaging apparatus, an operation method for a lens device, an operation method for an imaging apparatus, and a program according to the technology of the present disclosure will be described with reference to the accompanying drawings.

The terms used in the following description will be described first.

The CPU refers to an abbreviation of "Central Processing Unit". GPU refers to an abbreviation of "Graphics Processing Unit". NVM refers to an abbreviation of "Non-Volatile Memory". RAM refers to an abbreviation of "Random Access Memory". IC refers to an abbreviation of "Integrated Circuit". ASIC refers to an abbreviation of "Application Specific Integrated Circuit". PLD refers to an abbreviation of "Programmable Logic Device". FPGA refers to an abbreviation of "Field-Programmable Gate Array". SoC refers to an abbreviation of "System-on-a-Chip". SSD refers to an abbreviation of "Solid State Drive". HDD refers to an abbreviation of "Hard Disk Drive". EEPROM refers to an abbreviation of "Electrically Erasable and Programmable Read Only Memory". SRAM refers to an abbreviation of "Static Random Access Memory". I/F refers to an abbreviation of "Interface". The UI refers to an abbreviation of "User Interface". USB refers to an abbreviation of "Universal Serial Bus". CMOS refers to an abbreviation of "Complementary Metal Oxide Semiconductor". CCD refers to an abbreviation of "Charge Coupled Device". LAN refers to an abbreviation of "Local Area Network". WAN refers to an abbreviation of "Wide Area Network". BPF refers to an abbreviation of "Band Pass Filter". Ir refers to an abbreviation of "Infrared Rays".

In the description of the present specification, "vertical/perpendicular" refers to the verticality/perpendicularity in the sense of including an error generally allowed in the technical field to which the technology of the present disclosure belongs, that is, an error to the extent that it does not contradict the gist of the technology of the present disclosure, in addition to the exact verticality/perpendicularity. In the description of the present specification, "horizontal" refers to the horizontality in the sense of including an error generally allowed in the technical field to which the technology of the present disclosure belongs, that is, an error to the extent that it does not contradict the gist of the technology of the present disclosure, in addition to the exact horizontality. In the description of the present specification, "parallel" refers to the parallelism in the sense of including an error generally allowed in the technical field to which the technology of the present disclosure belongs, that is, an error to the extent that it does not contradict the gist of the technology of the present disclosure, in addition to the exact parallelism. In the description of the present specification, "orthogonal" refers to the orthogonality in the sense of including an error generally allowed in the technical field to which the technology of the present disclosure belongs, that is, an error to the extent that it does not contradict the gist of the technology of the present disclosure, in addition to the exact orthogonality. In the description of the present specification, "match" refers to the match in the sense of including an error generally allowed in the technical field to which the technology of the present disclosure belongs, that is, an error to the extent that it does not contradict the gist of the technology of the present disclosure, in addition to the exact match. In the description of the present specification, "equal interval" refers to the equal interval in the sense of including an error generally allowed in the technical field to which the technology of the present disclosure belongs, that is, an error to the extent that it does not contradict the gist of the technology of the present disclosure, in addition to the exact equal interval.

Hereinafter, an embodiment of the technology of the present disclosure will be described.

(Surveillance System)

As an example, as shown in FIG. 1, a surveillance system S comprises a surveillance camera 10 and a management device 11. The surveillance camera 10 is an example of an "imaging apparatus" according to the technology of the present disclosure.

The surveillance camera 10 is installed on a pillar, a wall, or the like indoors or outdoors, images a surveillance target which is a subject, and generates a moving image by the imaging. The moving image includes images of a plurality of frames obtained by the imaging. The surveillance camera 10 transmits the moving image obtained by the imaging to the management device 11 via a communication line 12. The management device 11 receives the moving image transmitted by the surveillance camera 10, and displays the received moving image on a display 13 or stores the received moving image in a storage device 14.

It should be noted that an X axis shown in FIG. 1 corresponds to a pitch axis of the surveillance camera 10, a Y axis corresponds to a yaw axis of the surveillance camera 10, and a Z axis corresponds to a roll axis of the surveillance camera 10. Hereinafter, a direction along the X axis will be referred to as an X axis direction, a direction along the Y axis will be referred to as a Y axis direction, and a direction along the Z axis will be referred to as a Z axis direction. The X axis direction, the Y axis direction, and the Z axis direction are orthogonal to each other. The X-Y coordinate plane used in the following description is defined by the X axis direction and the Y axis direction.

(Surveillance Camera)

Figure 2:
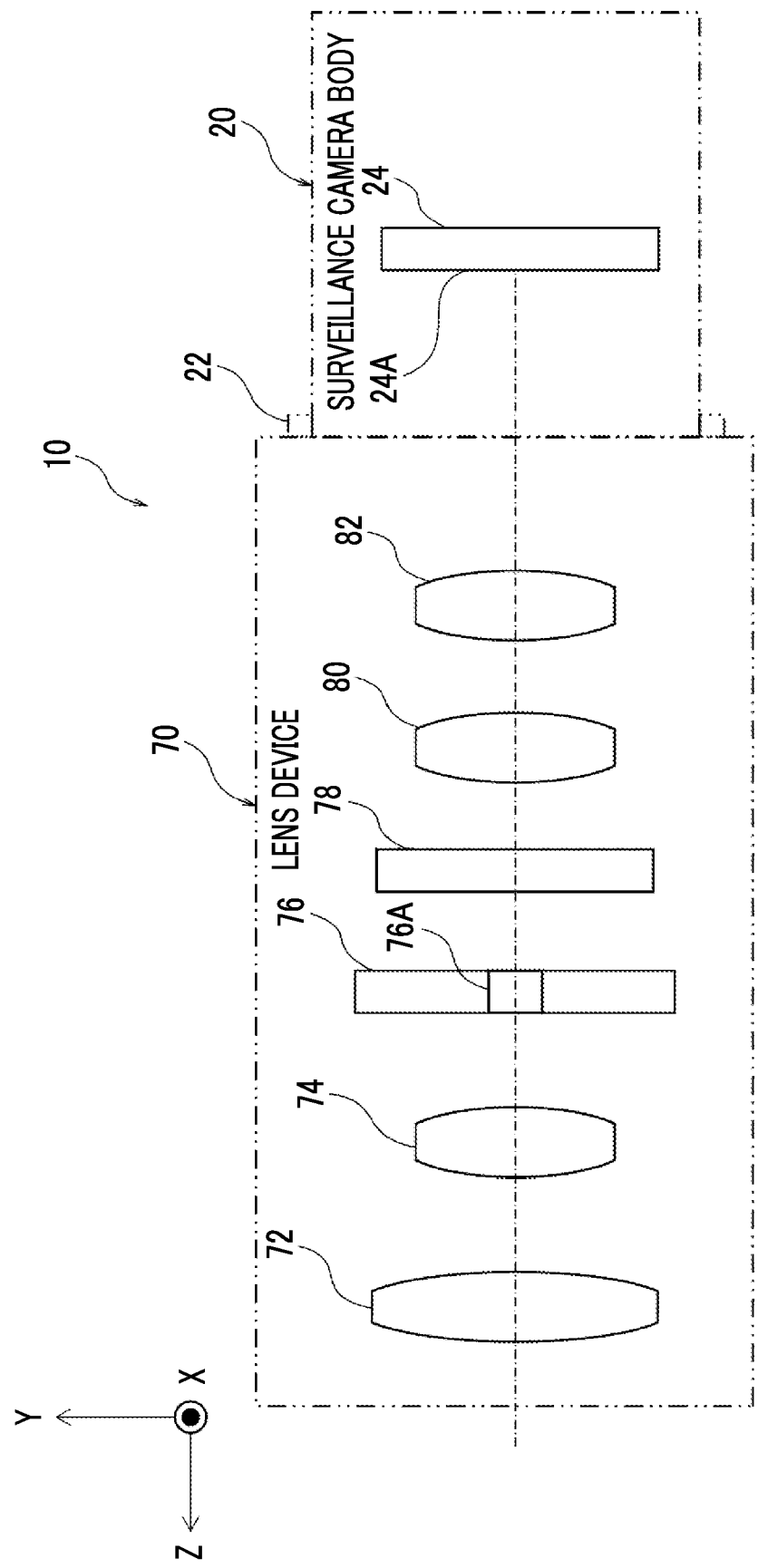
FIG. 2 is a side view showing an example of a configuration of an optical system of a surveillance camera according to the embodiment of the technology of the present disclosure.

As an example, as shown in FIG. 2, the surveillance camera 10 comprises a surveillance camera body 20 and a lens device 70. The surveillance camera body 20 is an example of an "imaging apparatus body" according to the technology of the present disclosure. The surveillance camera body 20 comprises a lens mount 22. The lens device 70 is a separate body from the surveillance camera body 20, and is attachably and detachably mounted on the lens mount 22. The lens device 70 is provided in the surveillance camera body 20 by being mounted on the lens mount 22.

The surveillance camera body 20 comprises an image sensor 24. The image sensor 24 is, for example, a CMOS image sensor, which performs photoelectric conversion of received light and outputs an electrical signal corresponding to the received light. The CMOS image sensor is merely an example, and the image sensor 24 may be an image sensor having an operation system different from the CMOS image sensor, such as a CCD image sensor.

The image sensor 24 has a light-receiving surface 24A. Imaging region light incident on the lens device 70 is imaged on the light-receiving surface 24A by the lens device 70. An image is obtained by imaging the imaging region light on the light-receiving surface 24A. A plurality of photodiodes are disposed in a matrix on the light-receiving surface 24A. Each photodiode receives the imaging region light. The image sensor 24 images the imaging region by receiving an imaging region light. As an example, the plurality of photodiodes include a silicon photodiode having sensitivity to visible light and an indium gallium arsenide photodiode having sensitivity to near-infrared light. The image sensor 24 performs the imaging on each of the visible light and the near-infrared light included in the imaging region light imaged on the light-receiving surface 24A.

The lens device 70 has an optical axis OA. As an example, the optical axis OA is an axis that passes through the center of the light-receiving surface 24A and is perpendicular to the light-receiving surface 24A. The optical axis OA is parallel to the Z axis. As an example, the lens device 70 comprises a focus lens 72, a zoom lens 74, a stop 76, a filter unit 78, a shake correction lens 80, and a shift lens 82. The optical axis OA is an axis that passes through the center of each lens of the focus lens 72, the zoom lens 74, the shake correction lens 80, and the shift lens 82. The optical axis OA is also an optical axis of each lens of the focus lens 72, the zoom lens 74, the shake correction lens 80, and the shift lens 82.

The focus lens 72, the zoom lens 74, the stop 76, the filter unit 78, the shake correction lens 80, and the shift lens 82 are disposed in order along the optical axis OA from a subject side to an image side. As an example, the shake correction lens 80 and the shift lens 82 are disposed on the image sensor 24 side with respect to the zoom lens 74. In addition, as an example, the shake correction lens 80 and the shift lens 82 are disposed on the image sensor 24 side with respect to the focus lens 72. In addition, as an example, the shake correction lens 80 and the shift lens 82 are disposed on the image sensor 24 side with respect to the stop 76. The filter unit 78 is disposed on the subject side with respect to the image sensor 24. For example, the filter unit 78 is disposed between the stop 76 and the shake correction lens 80.

The shake correction lens 80 is an example of a "movement lens" and a "first lens" according to the technology of the present disclosure, and the shift lens 82 is an example of the "movement lens" and a "second lens" according to the technology of the present disclosure. A plurality of lenses including the focus lens 72, the zoom lens 74, the shake correction lens 80, and the shift lens 82 are examples of a "lens" according to the technology of the present disclosure. The optical axis OA is an example of an "optical axis of the lens" according to the technology of the present disclosure, and the X-Y coordinate plane is an example of a "coordinate plane intersecting the optical axis of the lens" according to the technology of the present disclosure. The X axis direction is an example of a "first direction" according to the technology of the present disclosure, and the Y axis direction is an example of a "second direction intersecting the first direction" according to the technology of the present disclosure.

The imaging region light is incident on the focus lens 72. The incident imaging region light is guided by the focus lens 72 to the zoom lens 74. The zoom lens 74 consists of a lens group including the plurality of lenses that are movable along the optical axis OA, and is used for zooming of the imaging region.

The stop 76 has an aperture 76A. The imaging region light guided by the zoom lens 74 passes through the aperture 76A. The stop 76 is a movable stop in which a diameter of the aperture 76A can be changed. That is, an amount of light of the imaging region light is changed by the stop 76.

The imaging region light transmitted through the stop 76 is incident on the filter unit 78. Although the details will be described below, the filter unit 78 includes a plurality of optical filters having translucency, and selectively transmits light in a plurality of wavelength ranges included in the imaging region light (for example, the visible light, the near-infrared light in different wavelength ranges in a near-infrared wavelength range) by switching the optical filter that transmits the light among the plurality of optical filters. The filter unit 78 is an example of a "switching mechanism for switching a wavelength range of the light transmitted through the lens" according to the technology of the present disclosure.

As described below, the shake correction lens 80 is a lens for correcting the shake of the image obtained by imaging the imaging region light on the image sensor 24, and the shift lens 82 is a lens for shifting the image along the light-receiving surface 24A of the image sensor 24. A master lens group is formed by the shake correction lens 80 and the shift lens 82. The master lens group may include a lens other than the shake correction lens 80 and the shift lens 82.

The imaging region light incident on the shift lens 82 is imaged on the light-receiving surface 24A. In this way, the imaging region light incident on the lens device 70 is guided to the image sensor 24 by the plurality of lenses provided in the lens device 70, and is imaged on the light-receiving surface 24A of the image sensor 24. It should be noted that each of the focus lens 72, the zoom lens 74, the shake correction lens 80, and the shift lens 82 may be a single lens or may be a lens group including the plurality of lenses. In addition, the lens device 70 may comprise other lenses in addition to the focus lens 72, the zoom lens 74, the shake correction lens 80, and the shift lens 82. Further, the arrangement order of the focus lens 72, the zoom lens 74, the stop 76, the filter unit 78, the shake correction lens 80, and the shift lens 82 may be the arrangement order other than the above.

(Filter Unit 78)

Figure 3:
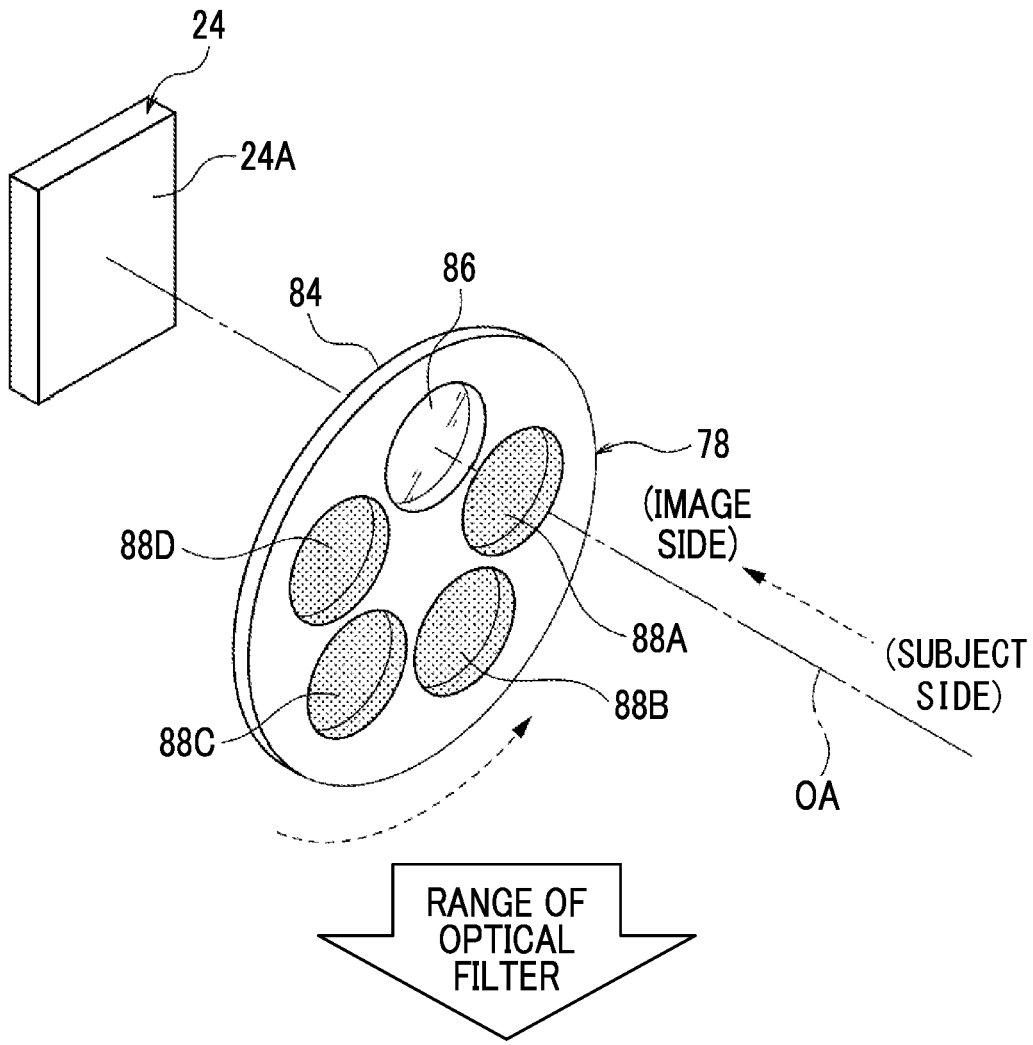
FIG. 3 is a perspective view showing an example of a configuration of a filter unit and an image sensor according to the embodiment of the technology of the present disclosure.

As shown in FIG. 3 as an example, the filter unit 78 comprises a disk 84. As an example, the disk 84 is provided with an Ir cut filter 86, a first BPF 88A, a second BPF 88B, a third BPF 88C, and a fourth BPF 88D as the plurality of optical filters at equal intervals along a circumferential direction. In the following description, in a case in which the distinction is not necessary, the Ir cut filter 86, the first BPF 88A, the second BPF 88B, the third BPF 88C, and the fourth BPF 88D will be referred to as the optical filter. In addition, in the following description, in a case in which the distinction is not necessary, the first BPF 88A, the second BPF 88B, the third BPF 88C, and the fourth BPF 88D will be referred to as the BPF 88.

The filter unit 78 selectively inserts and removes the plurality of optical filters by a turret system into and from an optical path of the imaging region light in the lens device 70 (hereinafter, simply referred to as the "optical path"). Specifically, by rotating the filter unit 78 along the circumferential direction (for example, a direction of an arc broken line arrow shown in FIG. 3), the Ir cut filter 86, the first BPF 88A, the second BPF 88B, the third BPF 88C, and the fourth BPF 88D are selectively inserted into and removed from the optical path (in the example shown in FIG. 3, the optical axis OA). As a result, the Ir cut filter 86, the first BPF 88A, the second BPF 88B, the third BPF 88C, and the fourth BPF 88D transmit light in different wavelength ranges, respectively.

In a case in which the optical filter is inserted into the optical path, the optical axis OA penetrates the center of the optical filter, and the center of the optical filter inserted into the optical path matches the center of the light-receiving surface 24A. In the example shown in FIG. 3, since the Ir cut filter 86 is inserted into the optical path, the optical axis OA penetrates the center of the Ir cut filter 86, and the center of the Ir cut filter 86 matches the center of the light-receiving surface 24A.

The Ir cut filter 86 is an optical filter that cuts infrared rays and transmits only light other than the infrared rays. The BPF 88 is an optical filter that transmits the near-infrared light. The first BPF 88A, the second BPF 88B, the third BPF 88C, and the fourth BPF 88D transmit the near-infrared light in different wavelength ranges, respectively.

The first BPF 88A is an optical filter corresponding to a range in the vicinity of 1000 nm (nanometers). That is, the first BPF 88A transmits only the near-infrared light in a range in the vicinity of 1000 nm. The second BPF 88B is an optical filter corresponding to a range in the vicinity of 1250 nm. That is, the second BPF 88B transmits only the near-infrared light in a range in the vicinity of 1250 nm. The third BPF 88C is an optical filter corresponding to a range in the vicinity of 1550 nm. That is, the third BPF 88C transmits only the near-infrared light in a range in the vicinity of 1550 nm. The fourth BPF 88D is an optical filter corresponding to a range in the vicinity of 2150 nm. That is, the fourth BPF 88D transmits only the near-infrared light in a range in the vicinity of 2150 nm. It should be noted that each of the ranges described herein includes an error that is generally allowed in the technical field to which the technology of the present disclosure belongs, that is, an error in a range that does not contradict the gist of the technology of the present disclosure. In addition, each of the wavelength ranges described herein is merely an example, and the wavelength ranges need only be different from each other.

(Image Sensor)

Figure 4:
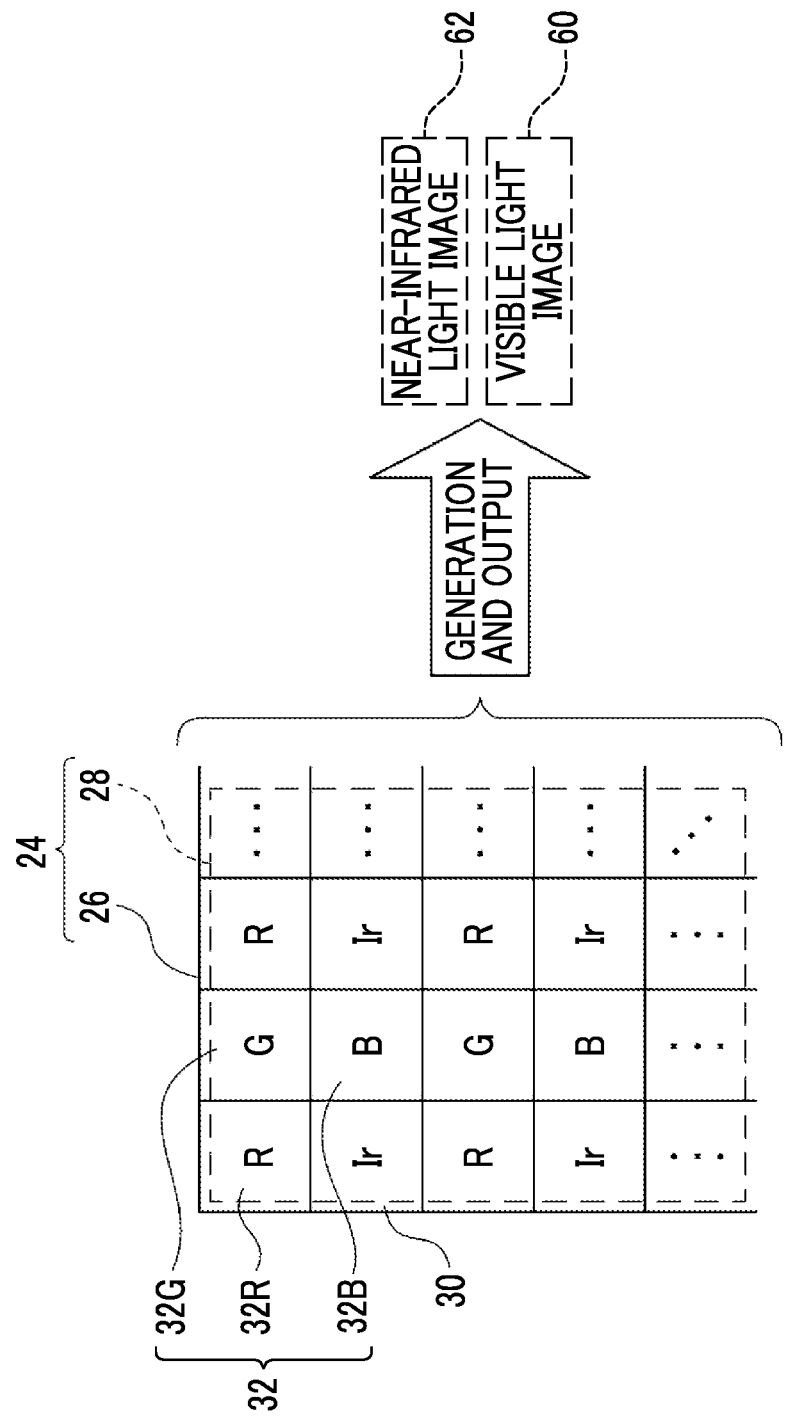
FIG. 4 is a front view showing an example of a configuration of a main part of the image sensor according to the embodiment of the technology of the present disclosure.

As shown in FIG. 4 as an example, the image sensor 24 includes a light reception unit 26 and a color filter unit 28. The light reception unit 26 includes a plurality of first light-receiving elements 30 and a plurality of second light-receiving elements 32. Examples of the first light-receiving element 30 include an indium gallium arsenide photodiode. Examples of the second light-receiving element 32 include a silicon photodiode.

The color filter unit 28 is disposed on the plurality of first light-receiving elements 30 and the plurality of second light-receiving elements 32. The color filter unit 28 includes an Ir filter, an R filter, a G filter, and a B filter. The Ir filter is a filter that transmits light having a near-infrared (Ir) component. The R filter is a filter that transmits light having a red (R) component. The G filter is a filter that transmits light having a green (G) component. The B filter is a filter that transmits light having a blue (B) component. It should be noted that the filters disposed in the color filter unit 28 can be freely changed, and all of the filters may be filters that transmit the light having the Ir component.

The first light-receiving element 30 is a light-receiving element having sensitivity to the light having the Ir component. The second light-receiving element 32 is roughly classified into a light-receiving element 32R having sensitivity to the light having the R component, a light-receiving element 32G having sensitivity to the light having the G component, and a light-receiving element 32B having sensitivity to the light having the B component.

The Ir filter is disposed on the first light-receiving element 30. The R filter is disposed on the light-receiving element 32R. The G filter is disposed on the light-receiving element 32G. The B filter is disposed on the light-receiving element 32B. It should be noted that a filter that blocks the near-infrared light is further disposed in each of the light-receiving elements 32R, 36G, and 36B.

In the image sensor 24 configured as described above, the plurality of first light-receiving elements 30 receive the near-infrared light transmitted through any of a plurality of BPFs 88, generate a near-infrared light image 62 based on the received near-infrared light, and output the generated near-infrared light image 62, and the plurality of second light-receiving elements 32 receive the visible light transmitted through the Ir cut filter 86, generate a visible light image 60 based on the received visible light, and output the visible light image 60.

(Surveillance Camera Body)

Figure 5:
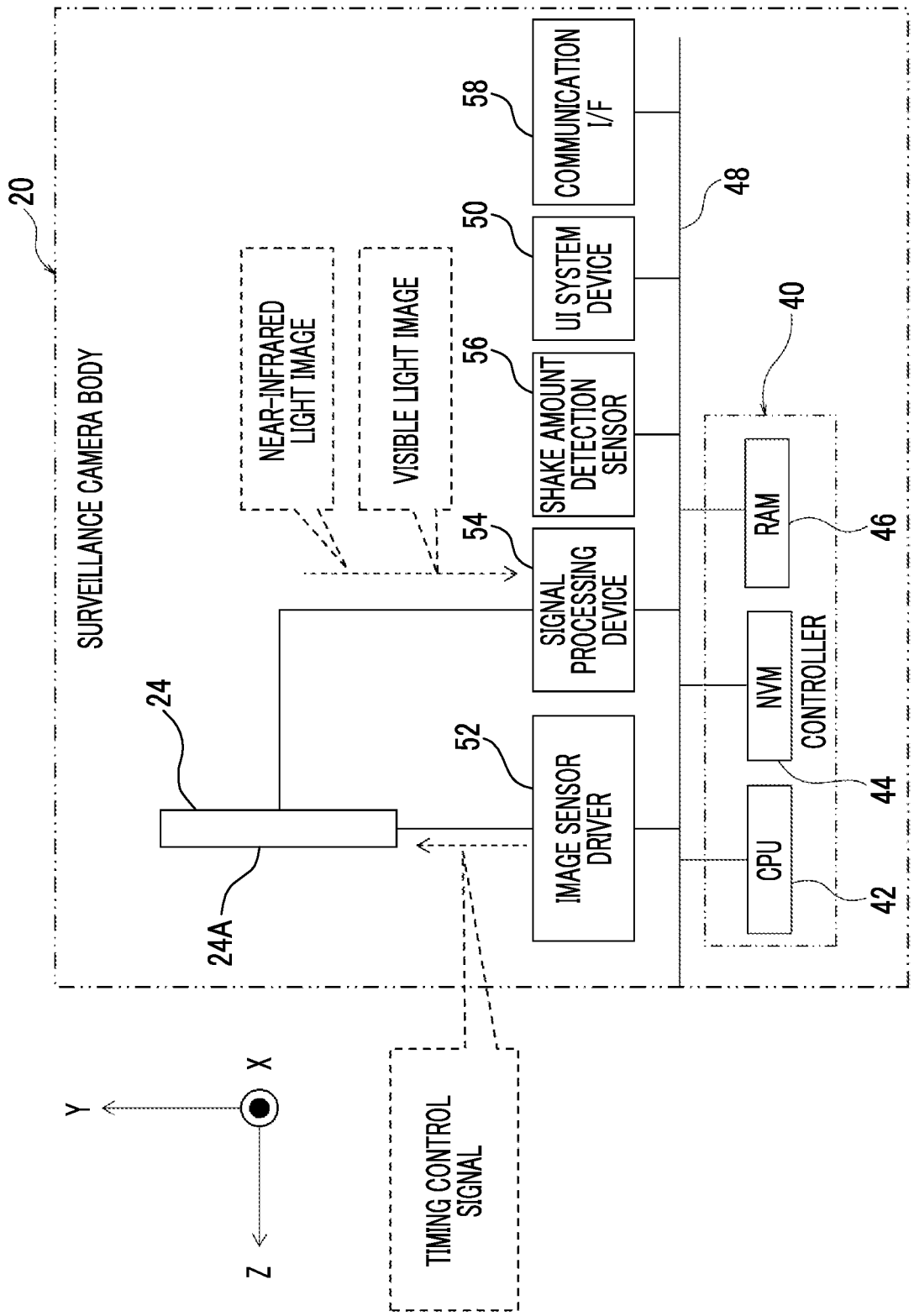
FIG. 5 is a block diagram showing an example of a configuration of a surveillance camera body according to the embodiment of the technology of the present disclosure.

As an example, as shown in FIG. 5, the surveillance camera body 20 comprises a controller 40 and a UI system device 50.

The controller 40 controls an operation of the surveillance camera body 20. The controller 40 comprises a CPU 42, an NVM 44, and a RAM 46. The CPU 42, the NVM 44, and the RAM 46 are connected to a bus 48.

Various parameters and various programs are stored in the NVM 44. Examples of the NVM 44 include an EEPROM (for example, a flash type EEPROM). The EEPROM is merely an example of the NVM 44. The NVM 44 need only be various non-volatile storage devices, such as an SSD and/or an HDD. The RAM 46 transitorily stores various types of information and is used as a work memory. Examples of the RAM 46 include a DRAM. The DRAM is merely an example of the RAM 46. The RAM 46 may be an SRAM, and need only be various volatile storage devices.

The NVM 44 stores various programs. The CPU 42 reads out a necessary program from the NVM 44 and executes the read out program on the RAM 46. The CPU 42 executes various types of processing according to the program executed on the RAM 46.

The UI system device 50 is also connected to the bus 48. Under the control of the CPU 42, the UI system device 50 receives an instruction given by a user, or presents various types of information obtained by being processed by the surveillance camera 10 to the user.

In addition, the surveillance camera body 20 comprises an image sensor driver 52, a signal processing device 54, a shake amount detection sensor 56, and a communication I/F 58. The image sensor driver 52, the signal processing device 54, the shake amount detection sensor 56, and the communication I/F 58 are connected to the bus 48.

As an example, as shown in FIG. 2, the image sensor 24 is positioned on the optical axis OA in the rear part of the shift lens 82, that is, on the image side with respect to the shift lens 82. As shown in FIG. 3 as an example, in a state in which the Ir cut filter 86 is disposed on the optical axis OA, the image sensor 24 images the imaging region based on the visible light imaged on the light-receiving surface 24A by the shift lens 82 to generate the visible light image 60 shown in FIG. 4, and outputs the generated visible light image 60 to the rear part. The visible light image 60 is an image showing the imaging region by the visible light.

In a state in which the BPF 88 (see FIG. 3) is disposed on the optical axis OA, the image sensor 24 images the imaging region based on the near-infrared light imaged on the light-receiving surface 24A by the shift lens 82 to generate the near-infrared light image 62 shown in FIG. 4, and outputs the generated near-infrared light image 62 to the rear part. The near-infrared light image 62 is an image showing the imaging region by the near-infrared light. It should be noted that, in the following description, in a case in which the distinction is not necessary, the near-infrared light image 62 and the visible light image 60 will be referred to as a "captured image" without reference numerals.

As an example, as shown in FIG. 5, the image sensor driver 52 and the signal processing device 54 are connected to the image sensor 24. Under the control of the CPU 42, the image sensor driver 52 outputs a timing control signal to the image sensor 24. The timing control signal is a signal for controlling the imaging by the image sensor 24. A frame rate of imaging by the image sensor 24 is defined by the timing control signal.

The timing control signal includes a vertical synchronizing signal and a horizontal synchronizing signal. The vertical synchronizing signal is a signal for defining a timing at which transmission of an analog image for one frame is started. The horizontal synchronizing signal is a signal for defining a timing at which output of the analog image for one horizontal line is started. The image sensor 24 starts the output of the captured image in units of frames to the signal processing device 54 in response to the vertical synchronizing signal input from the image sensor driver 52. In addition, the image sensor 24 starts the output of the captured image in units of horizontal lines to the signal processing device 54 in response to the horizontal synchronizing signal input from the image sensor driver 52.

Under the control of the CPU 42, the signal processing device 54 performs signal processing, such as demosaicing processing, noise removal processing, gradation correction processing, and color correction processing, on the captured image input from the image sensor 24. The captured image that has been subjected to the signal processing is output to the CPU 42 by the signal processing device 54. The CPU 42 stores the captured image input from the signal processing device 54 in a predetermined storage region (for example, the NVM 44 and/or the RAM 46).

The shake amount detection sensor 56 detects, for example, an amount of the shake of the surveillance camera 10 shown in FIG. 2 (hereinafter, also simply referred to as the "shake amount"). The shake of the surveillance camera 10 refers to a phenomenon in which a positional relationship between the optical axis OA and the light-receiving surface 24A is changed in the surveillance camera 10. In a case in which the shake of the surveillance camera 10 occurs, the shake of the image occurs. Examples of the image include an image obtained by being captured using the image sensor and/or an optical image obtained by being imaged on the light-receiving surface 24A (hereinafter, also simply referred to as an "image" or a "subject image"). In the present embodiment, the "shake of the image" means a phenomenon in which the subject image deviates from a reference position due to the inclination of the optical axis OA due to a vibration phenomenon, that is, a phenomenon in which the subject image deviates from the reference position due to the relative movement of the optical axis OA with respect to the subject. The vibration phenomenon refers to a phenomenon in which vibration generated from the outside of the surveillance camera 10 (for example, a hand, a wind, and/or a vehicle) and/or the inside of the surveillance camera 10 (for example, a motor mounted on the surveillance camera 10) is transmitted to the lens device 70 to cause the lens device 70 to vibrate. In addition, "inclination of the optical axis OA" means that, for example, the optical axis OA is inclined with respect to a reference axis (for example, the optical axis OA before the vibration phenomenon occurs (that is, the optical axis OA in a case in which the surveillance camera 10 is stationary)). In addition, the "reference position" refers to, for example, a position of the subject image obtained in a state in which the vibration is not applied to the lens device 70 (for example, a position of the subject image in the light-receiving surface 24A).

The shake amount detection sensor 56 shown in FIG. 5 is a gyro sensor, for example. The gyro sensor detects an amount of rotational shake about each of the X axis, the Y axis, and the Z axis. The shake amount detection sensor 56 transforms the amount of rotational shake about the X axis and the amount of rotational shake about the Y axis detected by the gyro sensor into the shake amount in a two-dimensional plane parallel to the X axis and the Y axis to detect the shake amount of the surveillance camera 10. It should be noted that the meaning of parallelism in the present embodiment includes the meaning of substantially parallelism including an error allowed in design and manufacturing, in addition to the meaning of the exact parallelism.

Here, the gyro sensor is shown as an example of the shake amount detection sensor 56, but this is merely an example, and the shake amount detection sensor 56 may be an acceleration sensor. The acceleration sensor detects the shake amount in a two-dimensional plane parallel to the X axis and the Y axis. The shake amount detection sensor 56 outputs the detected shake amount to the CPU 42.

In addition, although the form example is shown in which the shake amount is detected by a physical sensor called the shake amount detection sensor 56, the technology of the present disclosure is not limited to this. For example, a movement vector obtained by comparing the captured images before and after in time series, which are stored in the NVM 44 or the RAM 46, may be used as the shake amount. In addition, the shake amount to be finally used may be derived based on the shake amount detected by the physical sensor and the movement vector obtained by the image processing.

The communication I/F 58 is, for example, a network interface and controls transmission of various types of information to and from the management device 11 via a network. Examples of the network include a WAN, such as the Internet or a public communication network. The communication I/F 58 controls the communication between the surveillance camera 10 shown in FIG. 1 and the management device 11.

(Lens Device)

Figure 6:
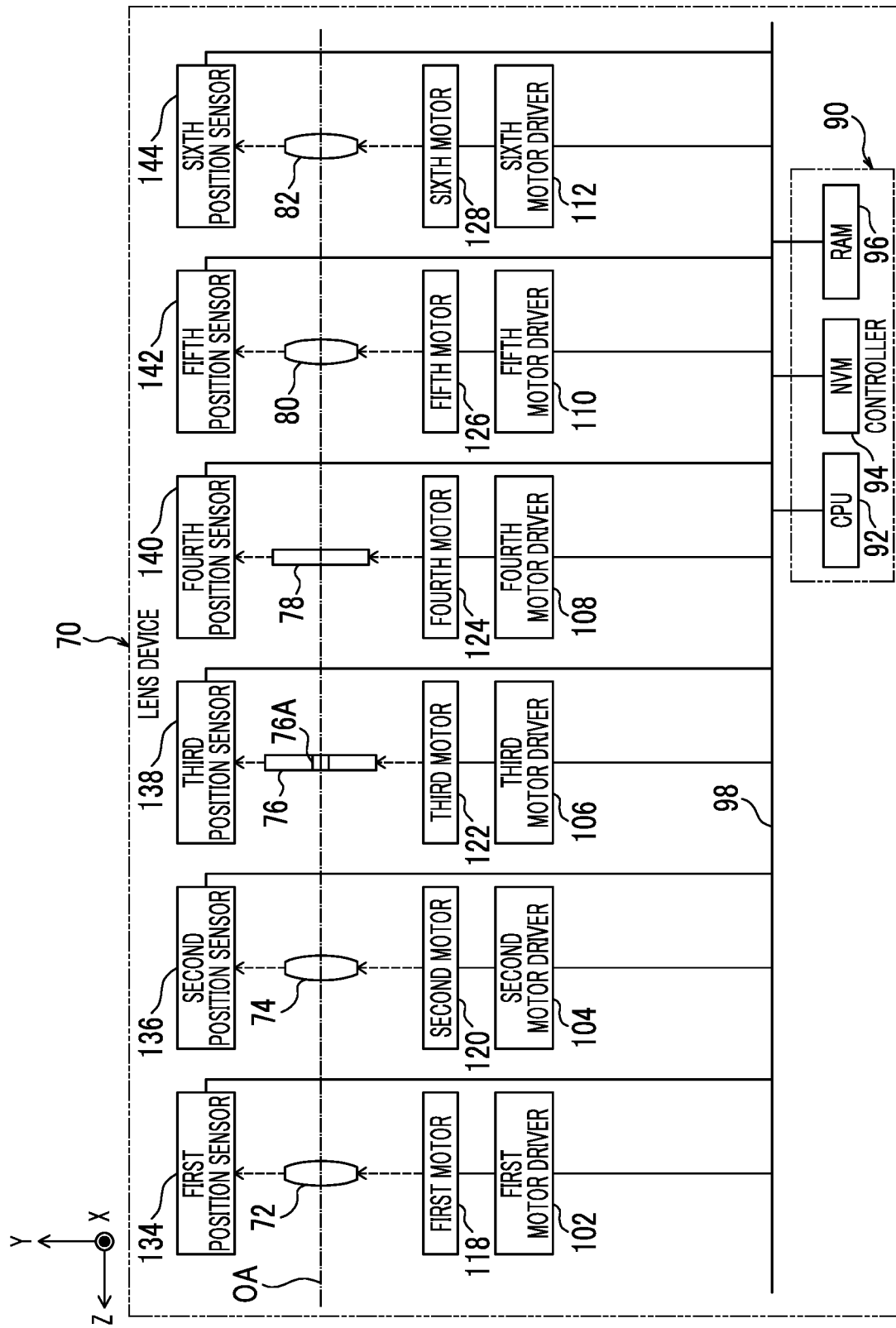
FIG. 6 is a block diagram showing an example of a configuration of a lens device according to the embodiment of the technology of the present disclosure.

As shown in FIG. 6 as an example, the lens device 70 comprises a controller 90. The controller 90 controls an operation of the lens device 70. The controller 90 comprises a CPU 92, an NVM 94, and a RAM 96. The controller 90 is an example of a "computer applied to a lens device", the CPU 92 is an example of a "processor" according to the technology of the present disclosure, and the RAM 96 is an example of a "memory" according to the technology of the present disclosure. The CPU 92, the NVM 94, and the RAM 96 are connected to a bus 98.

As an example, as shown in FIG. 2, in a state in which the lens device 70 is mounted on the lens mount 22 of the surveillance camera body 20, a connector (not shown) provided in the surveillance camera body 20 and a connector (not shown) provided in the lens device 70 are connected to each other. Then, the CPU 42 of the surveillance camera body 20 shown in FIG. 5 and the CPU 92 of the lens device 70 shown in FIG. 6 are connected to each other in a communicable manner via a connection path including the connector of the surveillance camera body 20 and the connector of the lens device 70. The CPU 92 of the lens device 70 controls the operation of the lens device 70 in response to an instruction given from the CPU 42 of the surveillance camera body 20.

Various parameters and various programs are stored in the NVM 94. Examples of the NVM 94 include an EEPROM (for example, a flash type EEPROM). The EEPROM is merely an example of the NVM 94. The NVM 94 need only be various non-volatile storage devices, such as an SSD and/or an HDD. The RAM 96 transitorily stores various types of information and is used as a work memory. Examples of the RAM 96 include a DRAM. The DRAM is merely an example of the RAM 96. The RAM 96 may be an SRAM, and need only be various volatile storage devices.

The NVM 94 stores various programs. The CPU 92 reads out a necessary program from the NVM 94 and executes the read out program on the RAM 96. The CPU 92 executes various types of processing according to the program executed on the RAM 96. In addition, the "various programs" described herein also include an imaging support processing program 100 (see FIG. 9), which will be described below.

In the lens device 70, the three-axes directions orthogonal to each other are defined by the X axis direction, the Y axis direction, and the Z axis direction. As an example, as shown in FIG. 2, in a state in which the lens device 70 is mounted on the lens mount 22 of the surveillance camera body 20, there is a possibility that the X axis direction, the Y axis direction, and the Z axis direction of the lens device 70 deviate from the X axis direction, the Y axis direction, and the Z axis direction of the surveillance camera 10, respectively, due to the influence of rattling or the like. However, in the following description, for convenience, the X axis direction, the Y axis direction, and the Z axis direction of the lens device 70 match the X axis direction, the Y axis direction, and the Z axis direction of the surveillance camera 10, respectively. The X axis direction and the Y axis direction are directions orthogonal to the optical axis OA of the lens device 70, respectively, and the Z axis direction is a direction parallel to the optical axis OA.

As an example, as shown in FIG. 6, the lens device 70 comprises a first motor driver 102, a second motor driver 104, a third motor driver 106, a fourth motor driver 108, a fifth motor driver 110, and a sixth motor driver 112. In addition, the lens device 70 comprises a first motor 118, a second motor 120, a third motor 122, a fourth motor 124, a fifth motor 126, and a sixth motor 128. Further, the lens device 70 comprises a first position sensor 134, a second position sensor 136, a third position sensor 138, a fourth position sensor 140, a fifth position sensor 142, and a sixth position sensor 144.

The first motor driver 102, the second motor driver 104, the third motor driver 106, the fourth motor driver 108, the fifth motor driver 110, the sixth motor driver 112, the first position sensor 134, the second position sensor 136, the third position sensor 138, the fourth position sensor 140, the fifth position sensor 142, and the sixth position sensor 144 are connected to the bus 98.

Examples of each of the first position sensor 134, the second position sensor 136, the third position sensor 138, the fourth position sensor 140, the fifth position sensor 142, and the sixth position sensor 144 include a potentiometer.

The first position sensor 134 detects a position of the focus lens 72 in the Z axis direction. The second position sensor 136 detects a position of the zoom lens 74 in the Z axis direction. The third position sensor 138 detects a diameter of the aperture 76A formed in the stop 76. The fourth position sensor 140 detects a rotational position of the filter unit 78 with respect to the optical axis OA. The fifth position sensor 142 detects a position of the shake correction lens 80 on the X-Y coordinate plane. The sixth position sensor 144 detects a position of the shift lens 82 on the X-Y coordinate plane.

A detection result by the first position sensor 134 is output to the CPU 92 by the first position sensor 134. A detection result by the second position sensor 136 is output to the CPU 92 by the second position sensor 136. A detection result by the third position sensor 138 is output to the CPU 92 by the third position sensor 138. A detection result by the fourth position sensor 140 is output to the CPU 92 by the fourth position sensor 140. A detection result by the fifth position sensor 142 is output to the CPU 92 by the fifth position sensor 142. A detection result by the sixth position sensor 144 is output to the CPU 92 by the sixth position sensor 144.

The focus lens 72 is attached to a first sliding mechanism (not shown). The first sliding mechanism is mechanically connected to a drive shaft of the first motor 118, and receives the power of the first motor 118 to move the focus lens 72 along the Z axis direction. The first motor driver 102 is connected to the first motor 118, and controls the first motor 118 in response to an instruction from the CPU 92. By controlling the first motor 118 via the first motor driver 102 based on the detection result by the first position sensor 134, the CPU 92 controls the position of the focus lens 72 in the Z axis direction.

The zoom lens 74 is attached to a second sliding mechanism (not shown). The second sliding mechanism is mechanically connected to a drive shaft of the second motor 120, and receives the power of the second motor 120 to move the zoom lens 74 along the Z axis direction. The second motor driver 104 is connected to the second motor 120, and controls the second motor 120 in response to an instruction from the CPU 92. By controlling the second motor 120 via the second motor driver 104 based on the detection result by the second position sensor 136, the CPU 92 controls the position of the zoom lens 74 in the Z axis direction.

The stop 76 has a plurality of blades (not shown) capable of opening and closing the aperture 76A. The plurality of blades are mechanically connected to a drive shaft of the third motor 122, and receive the power of the third motor 122 to open and close the aperture 76A. The third motor driver 106 is connected to the third motor 122, and controls the third motor 122 in response to an instruction from the CPU 92. By controlling the third motor 122 via the third motor driver 106 shown in FIG. 6 based on the detection result by the third position sensor 138 and the amount of received light on the light-receiving surface 24A shown in FIG. 5, the CPU 92 adjusts an opening degree of the aperture 76A.

The filter unit 78 is attached to a rotation mechanism (not shown). The rotation mechanism is mechanically connected to a drive shaft of the fourth motor 124, and receives the power of the fourth motor 124 to rotate the filter unit 78 (see FIG. 3) in the circumferential direction, so that the plurality of optical filters are inserted into and removed from the optical path. The fourth motor driver 108 is connected to the fourth motor 124, and controls the fourth motor 124 in response to an instruction from the CPU 92. By controlling the fourth motor 124 via the fourth motor driver 108 based on the detection result by the fourth position sensor 140, the CPU 92 controls the rotational position of the filter unit 78 with respect to the optical axis OA.

The shake correction lens 80 is attached to a fifth sliding mechanism (not shown). The fifth sliding mechanism is mechanically connected to a drive shaft of the fifth motor 126, and receives the power of the fifth motor 126 to move the shake correction lens 80 along the X-Y coordinate plane. In other words, the shake correction lens 80 is moved along the axial directions of both the X axis direction and the Y axis direction. The fifth motor driver 110 is connected to the fifth motor 126, and controls the fifth motor 126 in response to an instruction from the CPU 92. By controlling the fifth motor 126 via the fifth motor driver 110 based on the detection result by the fifth position sensor 142, the CPU 92 controls the position of the shake correction lens 80 on the X-Y coordinate plane. The fifth motor 126 is an example of a "drive mechanism" and a "first drive mechanism" according to the technology of the present disclosure.

It should be noted that, specifically, the fifth motor 126 that moves the shake correction lens 80 along the X-Y coordinate plane includes an X axis motor that moves the shake correction lens 80 along the X axis direction and a Y axis motor that moves the shake correction lens 80 along the Y axis direction. The X axis motor and the Y axis motor forming the fifth motor 126 are voice coil motors, for example. In addition, specifically, the fifth position sensor that detects the position of the shake correction lens 80 on the X-Y coordinate plane includes an X axis position sensor that detects a position of the shake correction lens 80 in the X axis direction and a Y axis position sensor that detects a position of the shake correction lens 80 in the Y axis direction.

The shift lens 82 is attached to a sixth sliding mechanism (not shown). The sixth sliding mechanism is mechanically connected to a drive shaft of the sixth motor 128, and receives the power of the sixth motor 128 to move the shift lens 82 along the X-Y coordinate plane. In other words, the shift lens 82 is moved along the axial directions of both the X axis direction and the Y axis direction. The sixth motor driver 112 is connected to the sixth motor 128, and controls the sixth motor 128 in response to an instruction from the CPU 92. By controlling the sixth motor 128 via the sixth motor driver 112 based on the detection result by the sixth position sensor 144, the CPU 92 controls the position of the shift lens 82 on the X-Y coordinate plane. The sixth motor 128 is an example of the "drive mechanism" and a "second drive mechanism" according to the technology of the present disclosure.

It should be noted that, specifically, the sixth motor 128 that moves the shift lens 82 along the X-Y coordinate plane includes an X axis motor that moves the shift lens 82 along the X axis direction and a Y axis motor that moves the shift lens 82 along the Y axis direction. The X axis motor and the Y axis motor forming the sixth motor 128 are direct current motors, for example. For example, a piezoelectric element may be used instead of the X axis motor and the Y axis motor forming the sixth motor 128. In addition, specifically, the sixth position sensor that detects the position of the shift lens 82 in the X-Y coordinate plane includes an X axis position sensor that detects a position of the shift lens 82 in the X axis direction and a Y axis position sensor that detects a position of the shift lens 82 in the Y axis direction.

In the lens device 70 having the configuration described above, in order to suppress the transmission of the vibration between the fifth motor 126 and the sixth motor 128, it is preferable that the fifth motor 126 and the sixth motor 128 are separated from each other to such an extent that the vibration is not transmitted. In addition, it is preferable that the fifth motor 126 is fixed to a housing of the lens device 70 via an anti-vibration elastic member, such as a rubber sheet. Similarly, it is preferable that the sixth motor 128 is fixed to a housing of the lens device 70 via an anti-vibration elastic member, such as a rubber sheet.

(Comparison of Optical Characteristic of Shake Correction Lens and Optical Characteristic of Shift Lens)

Figure 7:
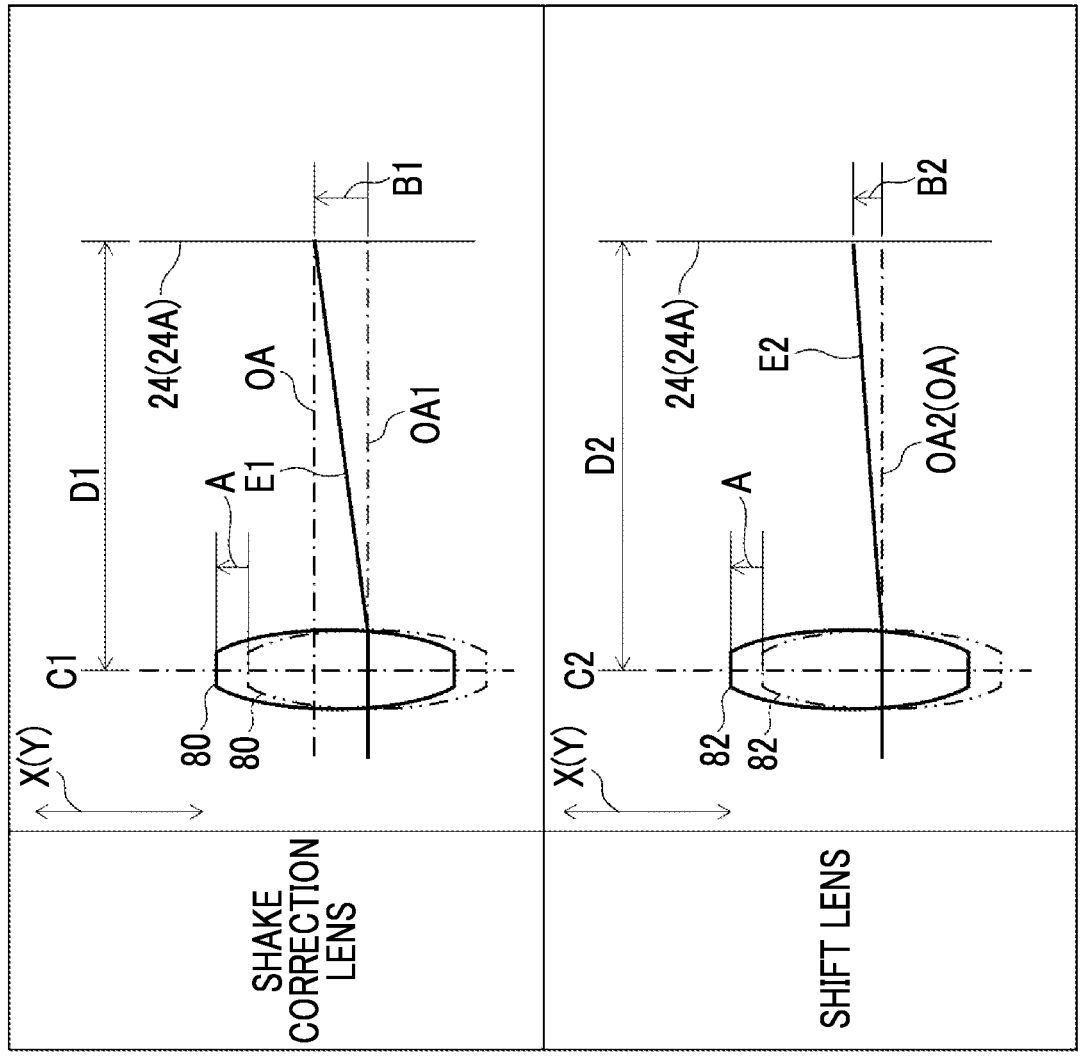
FIG. 7 is a comparative diagram comparing an example of an optical characteristic of a shake correction lens and an optical characteristic of a shift lens according to the embodiment of the technology of the present disclosure.

FIG. 7 shows a comparison of examples of an optical characteristic of the shake correction lens 80 and an optical characteristic of the shift lens 82. The optical characteristic of the shake correction lens 80 and the optical characteristic of the shift lens 82 are different from each other. The optical characteristic described herein is a characteristic caused by, for example, a thickness, a diameter, a material, or the like of the lens, and is, for example, an optical characteristic including a refractive index or the like. Hereinafter, a difference between the optical characteristic of the shake correction lens 80 and the optical characteristic of the shift lens 82 will be described based on a difference between the shake correction sensitivity of the shake correction lens 80 and the shift sensitivity of the shift lens 82.

It should be noted that, in the upper part of FIG. 7, the shake correction lens 80 shown by a two-point chain line represents the shake correction lens 80 before the shake of the image is corrected, and the shake correction lens 80 shown by a solid line represents the shake correction lens 80 moved to a position at which the shake of the image is corrected. In addition, the optical axis OA represents the optical axis OA that passes through the center of the light-receiving surface 24A of the image sensor 24 and is perpendicular to the light-receiving surface 24A, and an optical axis OA1 represents an optical axis of the shake correction lens 80 before the shake of the image is corrected. In a case in which the shake correction lens 80 is moved to the position at which the shake of the image is corrected, a central ray E1 passing through the shake correction lens 80 after the movement on the optical axis OA1 is imaged at the center of the light-receiving surface 24A.

In the present description, the shake correction sensitivity of the shake correction lens 80 is a ratio of a shake correction amount B1 of the image on the light-receiving surface 24A of the image sensor 24 to a unit movement amount A of the shake correction lens 80. The unit movement amount A of the shake correction lens 80 is a predetermined regular movement amount in a case in which the shake correction lens 80 is moved in the X axis direction or the Y axis direction. The shake correction amount B1 of the image is a movement amount of the center of the image accompanying the correction of the shake of the image, and corresponds to a distance between the optical axis OA1 and the optical axis OA of the light-receiving surface 24A of the image sensor 24. In the present description, correcting the shake of the image means restoring the center of the shaken image to the optical axis OA before the shake occurs.

In addition, in the lower part of FIG. 7, the shift lens 82 shown by a two-point chain line represents the shift lens 82 before the image is shifted, and the shift lens 82 shown by a solid line represents the shift lens 82 moved to a position at which the image is shifted. In addition, the optical axis OA represents the optical axis OA that passes through the center of the light-receiving surface 24A of the image sensor 24 and is perpendicular to the light-receiving surface 24A, and an optical axis OA2 represents an optical axis of the shift lens 82 before the image is shifted. In a case in which the shift lens 82 is moved to the position at which the image is shifted, a central ray E2 passing through the shift lens 82 after the movement on the optical axis OA2 (optical axis OA) is imaged at a position shifted from the center of the light-receiving surface 24A by a shift amount B2.

In the present description, the shift sensitivity of the shift lens 82 is a ratio of the shift amount B2 of the image on the light-receiving surface 24A of the image sensor 24 to the unit movement amount A of the shift lens 82. The unit movement amount A of the shift lens 82 is a predetermined regular movement amount in a case in which the shift lens 82 is moved in the X axis direction or the Y axis direction. The shift amount B2 of the image is a movement amount of the center of the image accompanying the shift of the image.

In the present description, on the assumption that a distance D1 from a center C1 of the shake correction lens 80 in a thickness direction to the light-receiving surface 24A of the image sensor 24 and a distance D2 from a center C2 of the shift lens 82 in a thickness direction to the light-receiving surface 24A of the image sensor 24 are the same, the difference between the shake correction sensitivity of the shake correction lens 80 and the shift sensitivity of the shift lens 82 will be specifically described.

As shown in FIG. 7 as an example, in a case in which it is assumed that the distance D1 and the distance D2 are the same, the shift sensitivity of the shift lens 82 is lower than the shake correction sensitivity of the shake correction lens 80. In other words, in a case in which the unit movement amount A of the shake correction lens 80 and the unit movement amount A of the shift lens 82 are the same, the shift amount B2 of the image on the light-receiving surface 24A of the image sensor 24 with respect to the movement of the shift lens 82 in the unit movement amount A is smaller than the shake correction amount B1 of the image on the light-receiving surface 24A of the image sensor 24 with respect to the movement of the shake correction lens 80 in the unit movement amount A. Stated another way, an optical characteristic value of the shake correction lens 80 and an optical characteristic value of the shift lens 82 are set to values at which the shift sensitivity of the shift lens 82 is lower than the shake correction sensitivity of the shake correction lens 80, respectively.

It should be noted that, in the present description, for the sake of convenience, it is assumed that the distance D1 from the center C1 of the shake correction lens 80 in the thickness direction to the light-receiving surface 24A of the image sensor 24 and the distance D2 from the center C2 of the shift lens 82 in the thickness direction to the light-receiving surface 24A of the image sensor 24 are the same. However, as shown in FIG. 2, the shake correction lens 80 and the shift lens 82 are disposed on the optical axis OA to be deviate from each other. Therefore, in the disposition of the shake correction lens 80 and the shift lens 82 shown in FIG. 2, the distance from the center of the shake correction lens 80 in the thickness direction to the light-receiving surface 24A of the image sensor 24 is different from the distance from the center of the shift lens 82 in the thickness direction to the light-receiving surface 24A of the image sensor 24.

Figure 8:
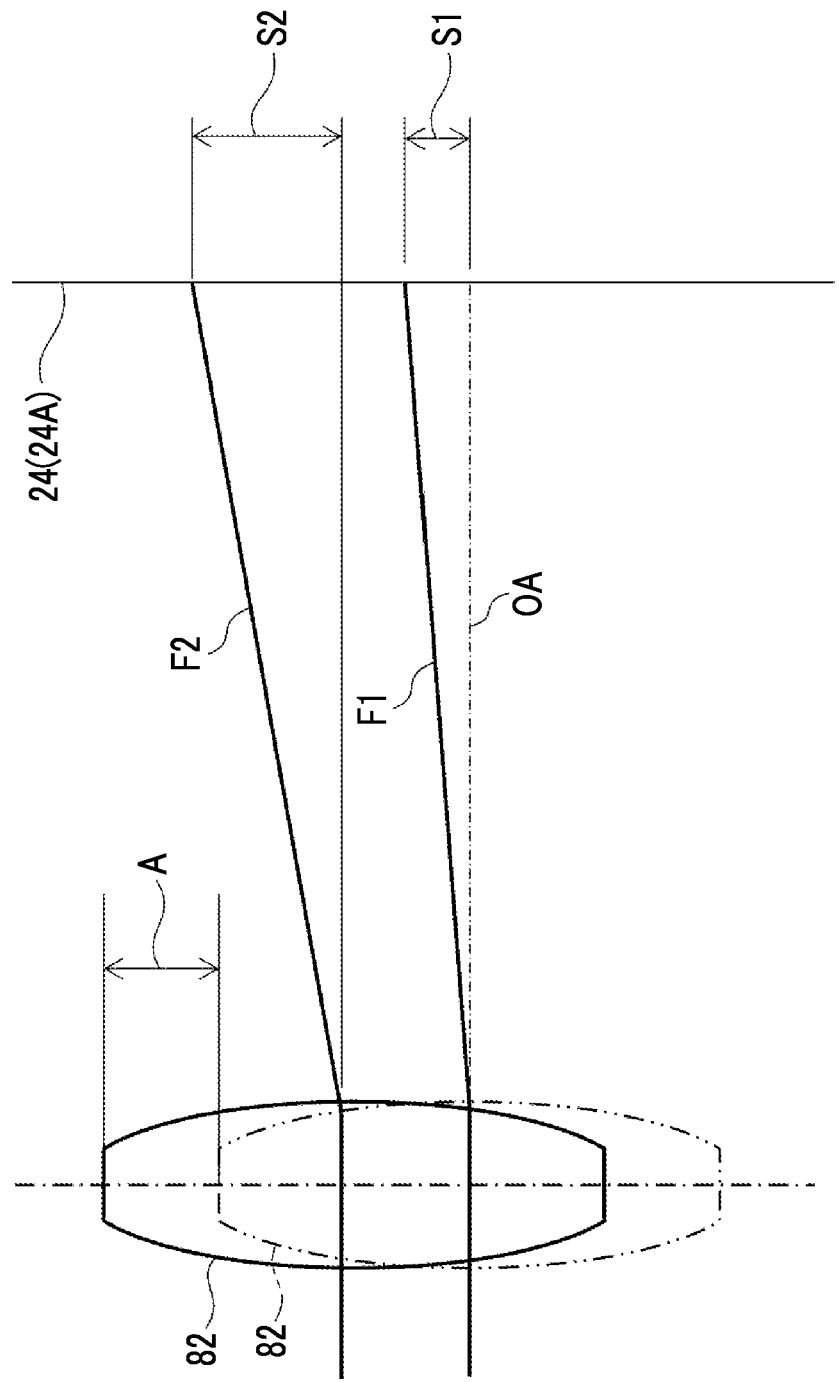
FIG. 8 is a side view showing an example of details of the optical characteristic of the shift lens according to the embodiment of the technology of the present disclosure.

Subsequently, the optical characteristic of the shift lens 82 will be described in more detail. FIG. 8 shows the example of the optical characteristic of the shift lens 82 in more detail. It should be noted that, in FIG. 8, the shift lens 82 shown by a two-point chain line represents the shift lens 82 before the image is shifted, and the shift lens 82 shown by a solid line represents the shift lens 82 moved to the position at which the image is shifted. In addition, the optical axis OA represents an optical axis that passes through the center of the light-receiving surface 24A of the image sensor 24 and is perpendicular to the light-receiving surface 24A.

A shift amount S1 is a shift amount of the central ray F1 passing through the shift lens 82 after the movement on the optical axis OA on the light-receiving surface 24A of the image sensor 24 with respect to the movement of the shift lens 82 in the unit movement amount A, and a shift amount S2 is a shift amount of a peripheral ray F2 passing through the shift lens 82 after the movement on a region other than the optical axis OA on the light-receiving surface 24A of the image sensor 24 with respect to the movement of the shift lens 82 in the unit movement amount A. Then, in the shift lens 82, the relationship of $0.8 \leq S2/S1 \leq 1.2$ is established. Stated another way, the optical characteristic value of the shift lens 82 is set to a value at which the relationship of $0.8 \leq S2/S1 \leq 1.2$ is established.

Here, in a case in which the value of S2/S1 is outside the defined range described above, that is, in a case in which $S2/S1 < 0.8$ or in a case in which $1.2 < S2/S1$, the continuity of image pixel values of the captured image obtained by being captured by the image sensor 24 is lost, a boundary portion of the image pixels is unnatural (for example, jagged), and an image quality of the captured image is outside an allowable range. In addition, in a case in which the image processing, such as edge enhancement, is applied to the captured image, the image processing is not performed well and the resolution of the captured image is lowered. On the other hand, in a case in which the optical characteristic value of the shift lens 82 is set to the value at which the relationship of $0.8 \leq S2/S1 \leq 1.2$ is established, the image quality of the captured image falls within the allowable range. In addition, the resolution of the captured image is improved as compared with a case in which the value of S2/S1 is outside the defined range described above.

(Functional Configuration of CPU of Lens Device)

Figure 9:
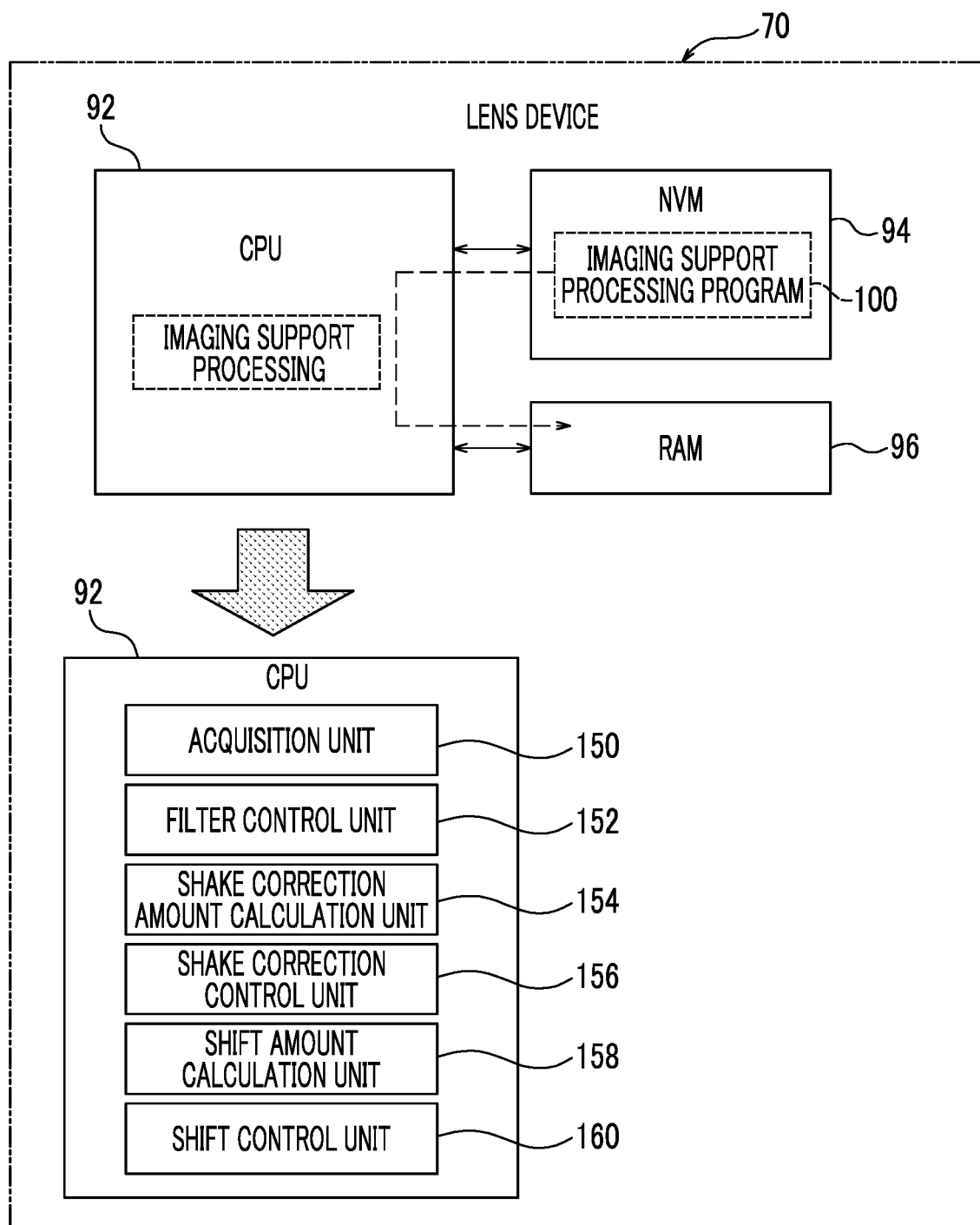
FIG. 9 is a block diagram showing an example of a functional configuration of a CPU of the lens device according to the embodiment of the technology of the present disclosure.

As shown in FIG. 9 as an example, the imaging support processing is realized by the CPU 92 of the lens device 70 executing the imaging support processing program 100. The imaging support processing program 100 is an example of a "program" according to the technology of the present disclosure. In the example shown in FIG. 9, the imaging support processing program 100 is stored in the NVM 94, and the CPU 92 reads out the imaging support processing program 100 from the NVM 94 and executes the read out imaging support processing program 100 on the RAM 96.

The CPU 92 performs the imaging support processing according to the imaging support processing program 100 executed on the RAM 96. By executing the imaging support processing program 100 on the RAM 96, the CPU 92 is operated as an acquisition unit 150, a filter control unit 152, a shake correction amount calculation unit 154, a shake correction control unit 156, a shift amount calculation unit 158, and a shift control unit 160. It should be noted that, although the details will be described below, the imaging support processing is processing including filter change processing (see FIG. 14), shake correction processing (see FIG. 15), and shift processing (see FIG. 16).

Figure 10:
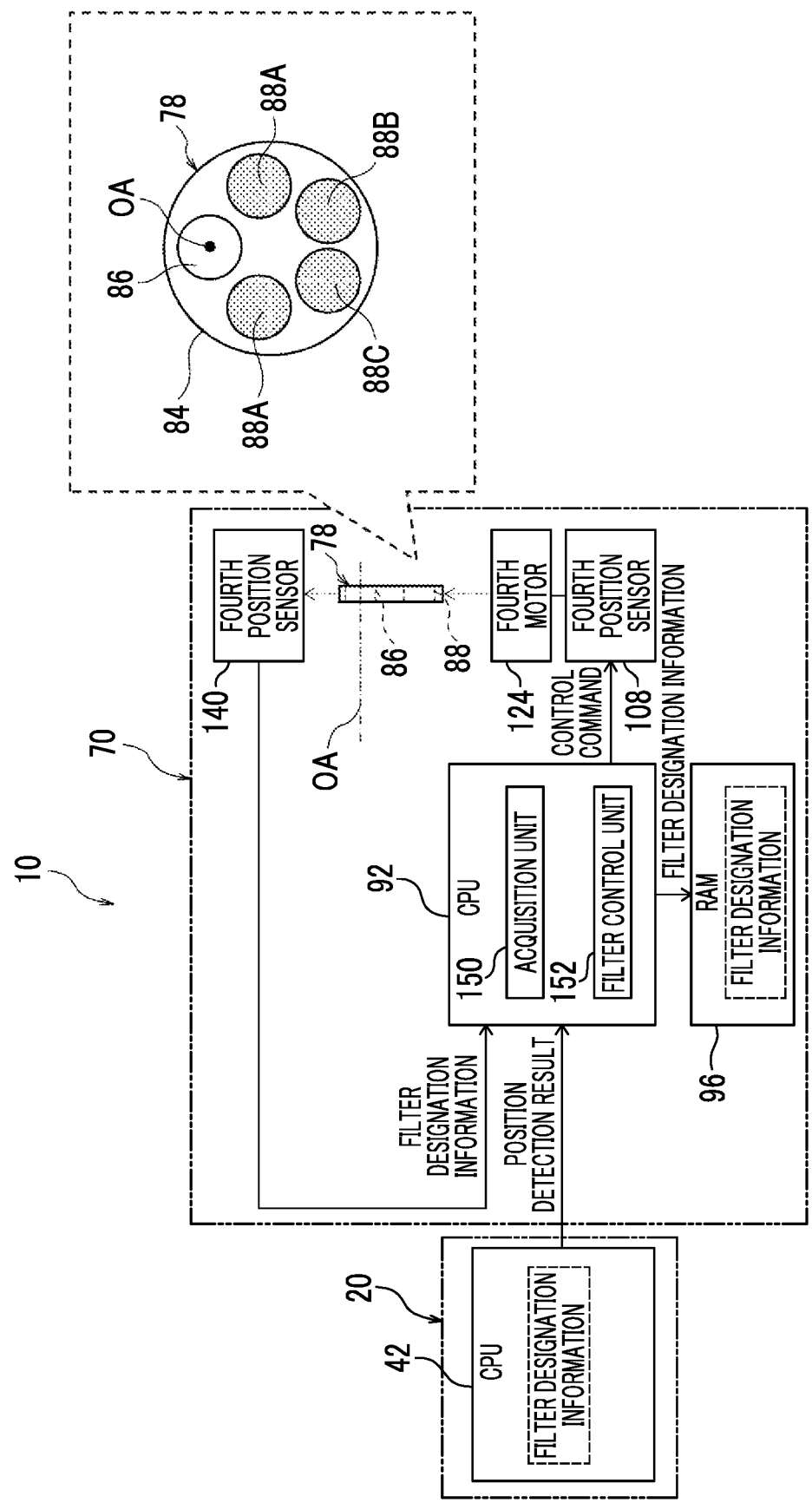
FIG. 10 is a block diagram showing an example of a configuration for executing filter change processing according to the embodiment of the technology of the present disclosure.

As shown in FIG. 10 as an example, the acquisition unit 150 acquires filter designation information as the information transmitted from the CPU 42 of the surveillance camera body 20. The filter designation information is command information for designating the optical filter to be used from among the plurality of optical filters. The optical filter to be used is an optical filter that is disposed on the optical axis OA among the plurality of optical filters provided in the filter unit 78. Also, the acquisition unit 150 acquires the position detection result by the fourth position sensor 140. The position detection result by the fourth position sensor 140 is information indicating a result of the detection the rotational position of the filter unit 78 with respect to the optical axis OA.

The filter control unit 152 outputs the control command for disposing the optical filter designated by the filter designation information on the optical axis OA to the fourth motor driver 108 based on the filter designation information transmitted from the CPU 42 and the position detection result by the fourth position sensor 140.

In a case in which the control command is received, the fourth motor driver 108 controls the fourth motor 124 in response to the control command. As a result, the optical filter designated by the filter designation information is disposed on the optical axis OA. For example, in a case in which the optical filter designated by the filter designation information is the Ir cut filter 86, the filter unit 78 is rotated to dispose the Ir cut filter 86 on the optical axis OA. FIG. 10 shows a state in which the Ir cut filter 86 is disposed on the optical axis OA, as an example. In this manner, the filter unit 78 is rotated to switch the filter to be disposed on the optical axis OA among the plurality of optical filters, so that the wavelength ranges of the light transmitted through the shake correction lens 80 and the shift lens 82 are switched.

In a case in which the filter control unit 152 performs control of disposing the optical filter designated by the filter designation information on the optical axis OA, the filter designation information is stored in the RAM 96. For example, in a case in which the Ir cut filter 86 is positioned on the optical axis OA, the filter control unit 152 stores the filter designation information indicating that the Ir cut filter 86 is designated in the RAM 96.

Figure 11:
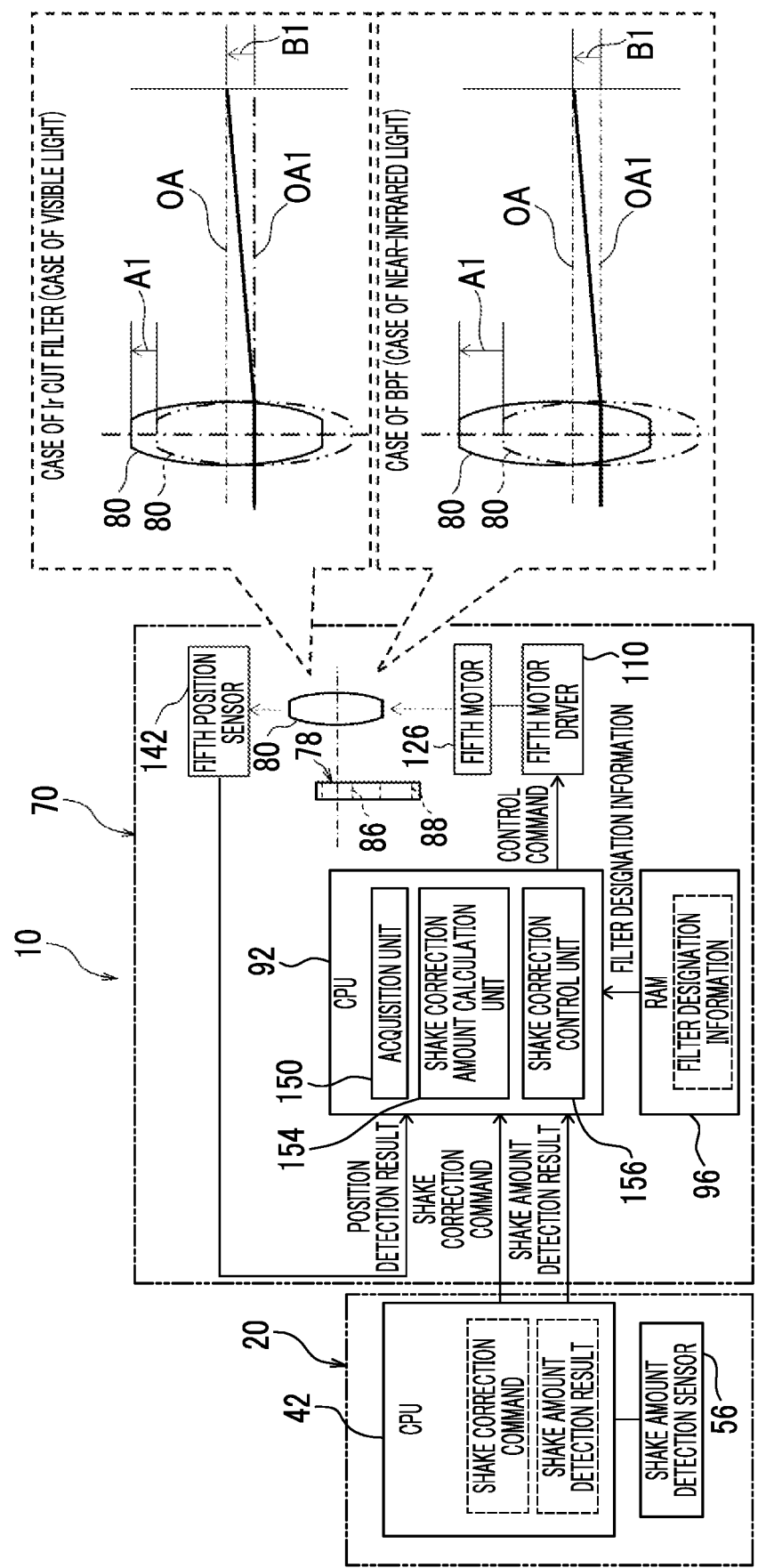
FIG. 11 is a block diagram showing an example of a configuration for executing shake correction processing according to the embodiment of the technology of the present disclosure.

In addition, as shown in FIG. 11 as an example, the acquisition unit 150 acquires a shake correction command and a shake amount detection result by the shake amount detection sensor 56 as the information transmitted from the CPU 42 of the surveillance camera body 20. The shake correction command is command information for requesting the shake correction, and the shake amount detection result by the shake amount detection sensor 56 is information indicating a result of the detection of the shake amount of the surveillance camera 10. Also, the acquisition unit 150 acquires the position detection result by the fifth position sensor 142. The position detection result by the fifth position sensor 142 is information indicating a result of the detection of the position of the shake correction lens 80 on the X-Y coordinate plane. Furthermore, the acquisition unit 150 acquires the filter designation information stored in the RAM 96.

The shake correction amount calculation unit 154 decides an operation direction of the fifth motor 126 for correcting the shake of the image based on the shake amount detection result by the shake amount detection sensor 56. The operation direction for correcting the shake of the image is decided in a direction opposite to a direction in which the image is shaken. In addition, the shake correction amount calculation unit 154 calculates an operation amount of the fifth motor 126 for correcting the shake of the image based on the shake amount detection result by the shake amount detection sensor 56. Specifically, the shake correction amount calculation unit 154 calculates an operation amount of the fifth motor 126 for restoring the position of the image shaken due to the shake of the surveillance camera 10 to the position of the image before the shake of the surveillance camera 10 occurs.

By the way, since the wavelength range differs between whether a case in which the light transmitted through the shake correction lens 80 is the visible light or a case in which the light transmitted through the shake correction lens 80 is the near-infrared light, the shake correction sensitivity of the shake correction lens 80 is changed due to the deviation of a position of a focus on the image side. Stated another way, as shown in FIG. 11, the movement amount A1 of the shake correction lens 80 required for the same shake correction amount B1 on the light-receiving surface 24A of the image sensor 24 differs between a case in which the light transmitted through the shake correction lens 80 is the visible light or a case in which the light transmitted through the shake correction lens 80 is the near-infrared light. Specifically, in a comparison using the same shake correction amount B1, the movement amount A1 required in a case in which the light transmitted through the shake correction lens 80 is the visible light is smaller than the movement amount A1 required in a case in which the light transmitted through the shake correction lens 80 is the near-infrared light.

Accordingly, the shake correction amount calculation unit 154 calculates an operation amount corresponding to the optical filter designated by the filter designation information for the operation amount of the fifth motor 126 that corrects the shake of the image. For example, in a case in which the optical filter designated by the filter designation information is the Ir cut filter 86, the shake correction amount calculation unit 154 calculates an operation amount corresponding to the Ir cut filter 86 based on the shake amount detection result by the shake amount detection sensor 56. In addition, in a case in which the optical filter designated by the filter designation information is the BPF 88, the shake correction amount calculation unit 154 calculates an operation amount corresponding to the BPF 88 based on the shake amount detection result by the shake amount detection sensor 56. In other words, the shake correction sensitivity of the shake correction lens 80 is changed in a case in which the wavelength range of the light transmitted through the shake correction lens 80 is changed, but even in a case in which the wavelength range of the light transmitted through the shake correction lens 80 is changed, the shake correction amount calculation unit 154 calculates the operation amount for obtaining the shake correction amount B1 proportional to the detection result of the shake amount detection sensor 56. The operation amount corresponding to the optical filter designated by the filter designation information may be determined in advance for each of the plurality of optical filters according to the shake amount detection result by the shake amount detection sensor 56, or may be calculated by using various calculation expressions.

In a case in which an operation direction of the fifth motor 126 decided by the shake correction amount calculation unit 154 and the operation amount of the fifth motor 126 calculated by the shake correction amount calculation unit 154 are acquired, the shake correction control unit 156 sets the acquired operation direction and operation amount of the fifth motor 126 as target values, and generates the control command based on the position detection result by the fifth position sensor 142. The control command is output to the fifth motor driver 110.

The fifth motor driver 110 generates an operation signal based on the control command generated by the shake correction control unit 156. The operation signal is a continuous wave, for example. The fifth motor 126 is operated in an operation direction and by an operation amount according to the operation signal. As a result, the shake correction lens 80 is moved in a direction in which the shake of the image is corrected, by applying the power to the shake correction lens 80. For example, the shake correction lens 80 is moved by the movement amount A1 corresponding to the Ir cut filter 86 in a case in which the optical filter designated by the filter designation information is the Ir cut filter 86, and the shake correction lens 80 is moved by the movement amount A1 corresponding to the BPF 88 in a case in which the optical filter designated by the filter designation information is the BPF 88.

As described above, the shake correction control unit 156 performs, with respect to the fifth motor 126, control of changing the movement amount A1 of the shake correction lens 80 based on the wavelength range of the light transmitted through the shake correction lens 80. Therefore, even in a case in which the wavelength range of the light transmitted through the shake correction lens 80 is changed, an influence of the change in the shake correction sensitivity of the shake correction lens 80 is suppressed, and the shake correction amount B1 proportional to the detection result by the shake amount detection sensor 56 is obtained. It should be noted that correcting the shake of the image described herein includes bringing the position of the image shaken due to the shake of the surveillance camera 10 closer to the position of the image before the shake of the surveillance camera 10 occurs, in addition to causing the position of the image shaken due to the shake of the surveillance camera 10 to match the position of the image before the shake of the surveillance camera 10 occurs.

The control by the shake correction control unit 156 is feedback control based on the shake amount detection result (that is, the shake amount of the surveillance camera 10) by the shake amount detection sensor 56.

Figure 12:
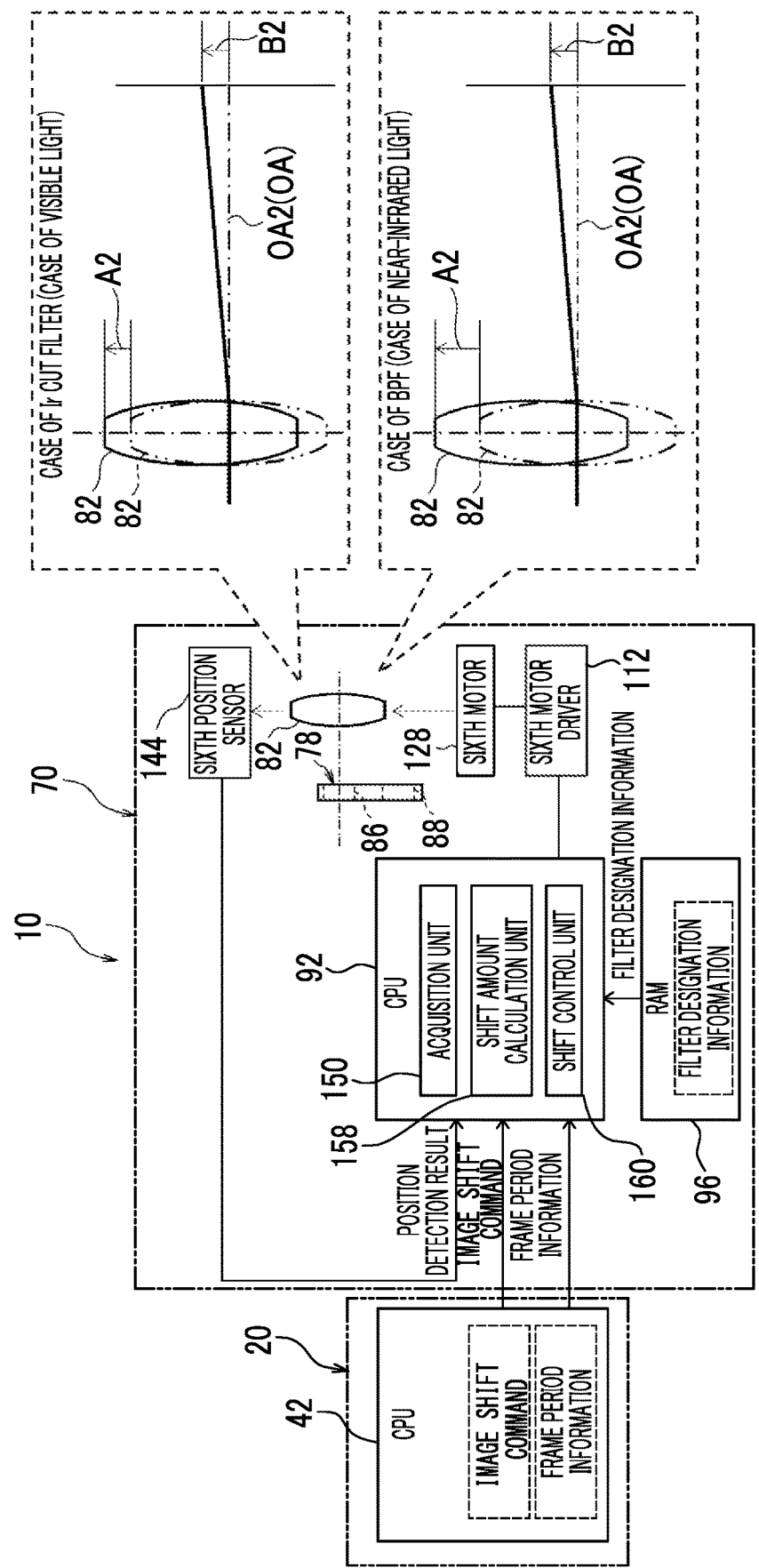
FIG. 12 is a block diagram showing an example of a configuration for executing shift processing according to the embodiment of the technology of the present disclosure.

In addition, as shown in FIG. 12 as an example, the acquisition unit 150 acquires an image shift command and frame period information as the information transmitted from the CPU 42 of the surveillance camera body 20. The image shift command is command information for requesting the shift of the image, and is information indicating a shift direction and the shift amount of the image. Also, the acquisition unit 150 acquires the position detection result by the sixth position sensor 144. Furthermore, the acquisition unit 150 acquires the filter designation information stored in the RAM 96.

The shift amount B2 of the image is defined, for example, by a pitch equal to or larger than a pixel pitch of the image sensor 24 or a pitch smaller than the pixel pitch of the image sensor 24. The pitch equal to or larger than the pixel pitch of the image sensor 24 is, for example, 1 pitch, 1.5 pitches, 2.5 pitches, or 3.5 pitches. In a case in which the pixel pitch of the image sensor 24 is denoted by p, the natural number is denoted by n, and the pure decimal is denoted by d, the pitch larger than the pixel pitch of the image sensor 24 is defined by $(n+d) \times p$. The pitch smaller than the pixel pitch of the image sensor 24 is, for example, 0.25 pitches, 0.5 pitches, or 0.75 pitches. In a case in which the pixel pitch of the image sensor 24 is denoted by p and the decimal smaller than 1 is denoted by D, the pitch smaller than the pixel pitch of the image sensor 24 is defined by $D \times p$.

The frame period information is information defining a frame period synchronized with the timing control signal output from the CPU 42 to the image sensor driver 52 (see FIG. 5). The frame period is a period in which the imaging is performed in units of frames.

The shift amount calculation unit 158 decides an operation direction of the sixth motor 128 for each frame period based on the shift direction of the image indicated by the image shift command, the frame period indicated by the frame period information, and the position detection result by the sixth position sensor 144. The operation direction of the sixth motor 128 is decided based on the shift direction of the image indicated by the image shift command and the position detection result by the sixth position sensor 144.

In addition, the shift amount calculation unit 158 calculates the operation amount of the sixth motor 128 for each frame period based on the shift amount of the image indicated by the image shift command, the frame period indicated by the frame period information, and the position detection result by the sixth position sensor 144. For example, in a case in which the shift amount of the image indicated by the image shift command is the same pitch as the pixel pitch of the image sensor 24, the shift amount calculation unit 158 calculates the operation amount of the sixth motor 128 that shifts the image by the same pitch as the pixel pitch of the image sensor 24. In addition, in a case in which the shift amount of the image indicated by the image shift command is the pitch larger than the pixel pitch of the image sensor 24, the shift amount calculation unit 158 calculates the operation amount of the sixth motor 128 that shifts the image by $(n+d) \times p$. In addition, in a case in which the shift amount of the image indicated by the image shift command is the pitch smaller than the pixel pitch of the image sensor 24, the shift amount calculation unit 158 calculates the operation amount of the sixth motor 128 that shifts the image by $D \times p$.

By the way, similarly to a case of the shake correction lens 80, since the wavelength range differs between whether a case in which the light transmitted through the shift lens 82 is the visible light or a case in which the light transmitted through the shift lens 82 is the near-infrared light, the shift sensitivity of the shift lens 82 is changed due to the deviation of a position of a focus on the image side. Stated another way, as shown in FIG. 12, the movement amount A2 of the shift lens 82 required for the same shift amount B2 on the light-receiving surface 24A of the image sensor 24 differs between a case in which the light transmitted through the shift lens 82 is the visible light or a case in which the light transmitted through the shift lens 82 is the near-infrared light. Specifically, in a comparison using the same shift amount B2, the movement amount A2 required in a case in which the light transmitted through the shift lens 82 is the visible light is smaller than the movement amount A2 required in a case in which the light transmitted through the shift lens 82 is the near-infrared light.

Accordingly, the shift amount calculation unit 158 calculates an operation amount corresponding to the optical filter designated by the filter designation information for the operation amount of the sixth motor 128 that shifts the image. For example, in a case in which the optical filter designated by the filter designation information is the Ir cut filter 86, the shift amount calculation unit 158 calculates the operation amount corresponding to the Ir cut filter 86 based on the shift amount of the image indicated by the image shift command. In addition, in a case in which the optical filter designated by the filter designation information is the BPF 88, the shift amount calculation unit 158 calculates the operation amount corresponding to the BPF 88 based on the shift amount of the image indicated by the image shift command. In other words, the shift sensitivity of the shift lens 82 is changed in a case in which the wavelength range of the light transmitted through the shift lens 82 is changed, but even in a case in which the wavelength range of the light transmitted through the shift lens 82 is changed, the shift amount calculation unit 158 calculates the operation amount for shifting the image to the position corresponding to the shift amount of the image indicated by the image shift command. The operation amount corresponding to the optical filter designated by the filter designation information may be determined in advance for each of the plurality of optical filters according to the shift amount of the image indicated by the image shift command, or may be calculated by using various calculation expressions.

The shift control unit 160 generates, for each frame period, a control command according to the operation direction of the sixth motor 128 decided by the shift amount calculation unit 158 and the operation amount of the sixth motor 128 calculated by the shift amount calculation unit 158. The control command is output to the sixth motor driver 112.

The sixth motor driver 112 generates an operation signal based on the control command generated by the shift control unit 160. The operation signal is a pulse wave, for example. A period of the operation signal is synchronized with the frame period defined by the frame period information. The sixth motor 128 is operated by an operation amount according to the operation signal. As a result, the shift lens 82 is moved in a direction for shifting the image for each frame period, by applying the power to the shift lens 82. For example, the shake correction lens 80 is moved by the movement amount A2 corresponding to the Ir cut filter 86 in a case in which the optical filter designated by the filter designation information is the Ir cut filter 86, and the shake correction lens 80 is moved by the movement amount A2 corresponding to the BPF 88 in a case in which the optical filter designated by the filter designation information is the BPF 88.

As described above, the shift control unit 160 performs, with respect to the sixth motor 128, control of changing the movement amount A2 of the shift lens 82 based on the wavelength range of the light transmitted through the shift lens 82. Therefore, even in a case in which the wavelength range of the light transmitted through the shake correction lens 80 is changed, an influence of the change in the shift sensitivity of the shift lens 82 is suppressed, and the image is shifted to the position corresponding to the shift amount of the image indicated by the image shift command.

The control by the shift control unit 160 is sequence control that is not based on the shake amount detection result (that is, the shake amount of the surveillance camera 10) by the shake amount detection sensor 56 and is based on predetermined shift sequence.

Figure 13:
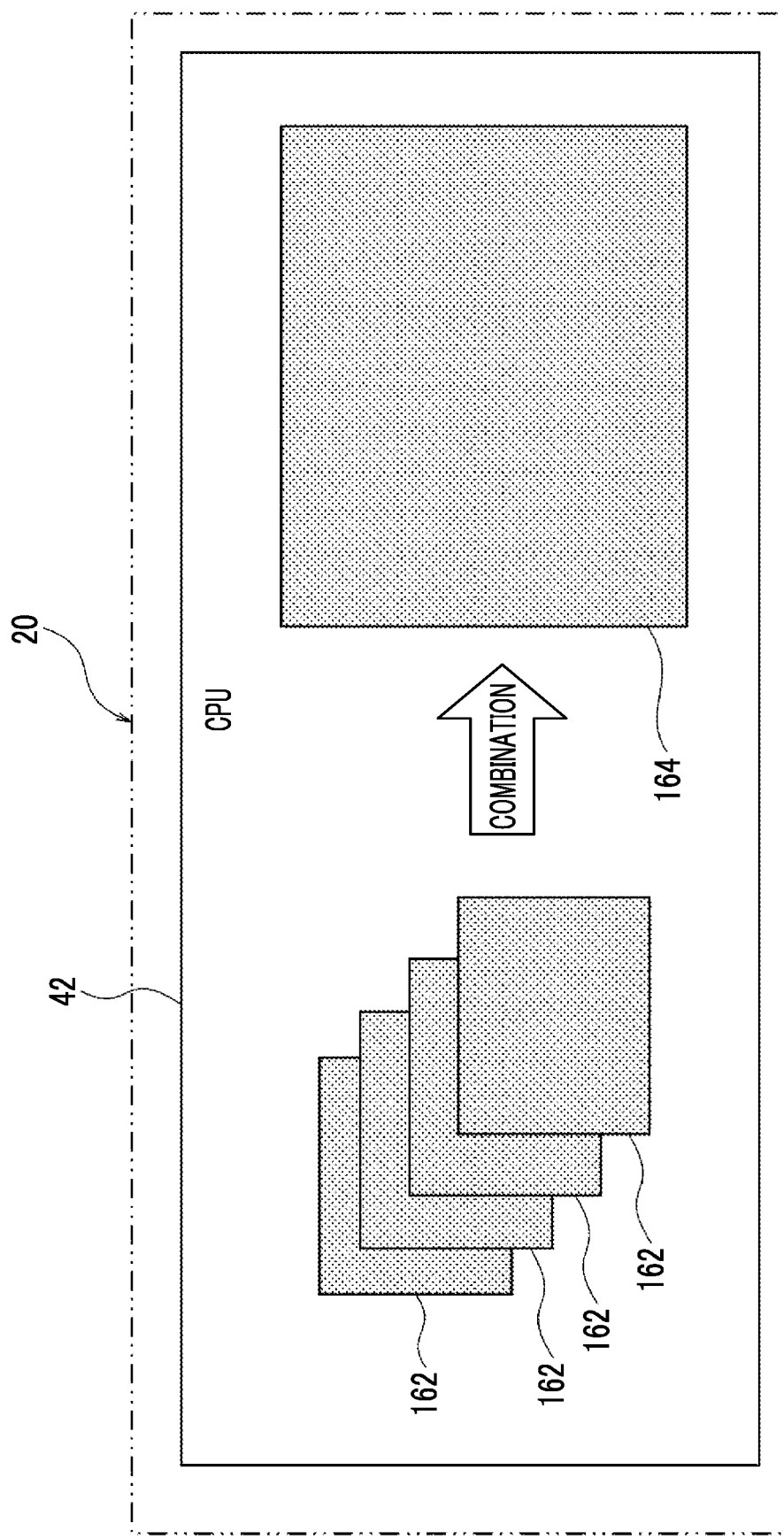
FIG. 13 is a block diagram showing an example of a configuration for obtaining a composite image in the surveillance camera according to the embodiment of the technology of the present disclosure.

Then, the image is shifted for each frame period, and the CPU 42 of the surveillance camera body 20 performs, with respect to the image sensor 24, control of performing the imaging each time the image is shifted. As a result, as shown in FIG. 13 as an example, images 162 of a plurality of frames corresponding to the frame periods, respectively, are obtained. Then, a composite image 164 is obtained by combining the images 162 of the plurality of frames by the CPU 42 of the surveillance camera body 20.

The composite image 164 is obtained, for example, as follows. That is, in a case in which the shift amount of the image is the same pitch as the pixel pitch of the image sensor 24, the composite image 164 is obtained from the images 162 of the plurality of frames by superimposing a plurality of image pixels forming one image and a plurality of image pixels forming the other image among the images 162 of the plurality of frames. The composite image 164 obtained in this way is an image that does not require the demosaicing processing. In addition, in a case in which the shift amount of the image is the pitch larger than the pixel pitch of the image sensor 24 or in a case in which the shift amount of the image is the pitch smaller than the pixel pitch of the image sensor 24, the composite image 164 is obtained from the images 162 of the plurality of frames by allocating a plurality of image pixels forming one image between a plurality of image pixels forming the other image among the images 162 of the plurality of frames. The composite image 164 obtained in this way is an image having a higher resolution than the images 162 of the plurality of frames.

Hereinafter, an action of the surveillance camera 10 (that is, an operation of the surveillance camera 10) according to the present embodiment will be described.

First, the filter change processing in the imaging support processing will be described with reference to FIGS. 10 and 14. In a case in which the filter designation information transmitted from the CPU 42 of the surveillance camera body 20 is received by a transmission/reception interface (not shown) of the lens device 70, the CPU 92 of the lens device 70 executes the filter change processing shown in FIG. 14.

In step ST100, first, the acquisition unit 150 acquires the filter designation information transmitted from the CPU 42 of the surveillance camera body 20. Also, the acquisition unit 150 acquires the position detection result by the fourth position sensor 140.

In next step ST102, the filter control unit 152 outputs the control command for disposing the optical filter designated by the filter designation information on the optical axis OA to the fourth motor driver 108 based on the filter designation information transmitted from the CPU 42 and the position detection result by the fourth position sensor 140.

In a case in which the control command is received, the fourth motor driver 108 controls the fourth motor 124 in response to the control command. As a result, the optical filter designated by the filter designation information is disposed on the optical axis OA. For example, in a case in which the optical filter designated by the filter designation information is the Ir cut filter 86, the filter unit 78 is rotated to dispose the Ir cut filter 86 on the optical axis OA. In this manner, the filter unit 78 is rotated to switch the filter to be disposed on the optical axis OA among the plurality of optical filters, so that the wavelength ranges of the light transmitted through the shake correction lens 80 and the shift lens 82 are switched.

In next step ST104, the filter control unit 152 stores the filter designation information in the RAM 96. For example, in a case in which the Ir cut filter 86 is positioned on the optical axis OA, the filter control unit 152 stores the filter designation information indicating that the Ir cut filter 86 is designated in the RAM 96.

Hereinafter, the shake correction processing in the imaging support processing will be described with reference to FIGS. 11 and 15. In a case in which the shake correction command transmitted from the CPU 42 of the surveillance camera body 20 is received by the transmission/reception interface (not shown) of the lens device 70, the CPU 92 of the lens device 70 executes the shake correction processing shown in FIG. 15.

In step ST110, first, the acquisition unit 150 acquires the shake correction command transmitted from the CPU 42 of the surveillance camera body 20. In addition, in step ST112, the acquisition unit 150 acquires the shake amount detection result transmitted from the CPU 42 of the surveillance camera body 20. Furthermore, in step ST114, the acquisition unit 150 acquires the filter designation information stored in the RAM 96. Also, the acquisition unit 150 acquires the position detection result by the fifth position sensor 142.

In next step ST116, the shake correction amount calculation unit 154 decides the operation direction of the fifth motor 126 for correcting the shake of the image based on the shake amount detection result by the shake amount detection sensor 56. The operation direction for correcting the shake of the image is decided in the direction opposite to the direction in which the image is shaken.

In addition, in step ST116, the shake correction amount calculation unit 154 calculates the operation amount of the fifth motor 126 for correcting the shake of the image based on the shake amount detection result by the shake amount detection sensor 56. Specifically, the shake correction amount calculation unit 154 calculates the operation amount of the fifth motor 126 for restoring the position of the image shaken due to the shake of the surveillance camera 10 to the position of the image before the shake of the surveillance camera 10 occurs.

In this case, the shake correction amount calculation unit 154 calculates the operation amount corresponding to the optical filter designated by the filter designation information for the operation amount of the fifth motor 126 that corrects the shake of the image. For example, in a case in which the optical filter designated by the filter designation information is the Ir cut filter 86, the shake correction amount calculation unit 154 calculates the operation amount corresponding to the Ir cut filter 86 based on the shake amount detection result by the shake amount detection sensor 56. In addition, in a case in which the optical filter designated by the filter designation information is the BPF 88, the shake correction amount calculation unit 154 calculates the operation amount corresponding to the BPF 88 based on the shake amount detection result by the shake amount detection sensor 56. In other words, the shake correction sensitivity of the shake correction lens 80 is changed in a case in which the wavelength range of the light transmitted through the shake correction lens 80 is changed, but even in a case in which the wavelength range of the light transmitted through the shake correction lens 80 is changed, the shake correction amount calculation unit 154 calculates the operation amount for obtaining the shake correction amount B1 proportional to the detection result of the shake amount detection sensor 56.

In next step ST118, in a case in which the operation direction of the fifth motor 126 decided by the shake correction amount calculation unit 154 and the operation amount of the fifth motor 126 calculated by the shake correction amount calculation unit 154 are acquired, the shake correction control unit 156 sets the acquired operation direction and operation amount of the fifth motor 126 as the target values, and generates the control command based on the position detection result by the fifth position sensor 142. The control command is output to the fifth motor driver 110.

The fifth motor driver 110 generates the operation signal based on the control command generated by the shake correction control unit 156. The operation signal is a continuous wave, for example. The fifth motor 126 is operated in the operation direction and by the operation amount according to the operation signal. As a result, the shake correction lens 80 is moved in the direction in which the shake of the image is corrected, by applying the power to the shake correction lens 80. For example, the shake correction lens 80 is moved by the movement amount A1 corresponding to the Ir cut filter 86 in a case in which the optical filter designated by the filter designation information is the Ir cut filter 86, and the shake correction lens 80 is moved by the movement amount A1 corresponding to the BPF 88 in a case in which the optical filter designated by the filter designation information is the BPF 88.

As described above, the shake correction control unit 156 performs, with respect to the fifth motor 126, control of changing the movement amount A1 of the shake correction lens 80 based on the wavelength range of the light transmitted through the shake correction lens 80. Therefore, even in a case in which the wavelength range of the light transmitted through the shake correction lens 80 is changed, the influence of the change in the shake correction sensitivity of the shake correction lens 80 is suppressed, and the shake correction amount B1 proportional to the detection result by the shake amount detection sensor 56 is obtained.

Hereinafter, the shift processing in the imaging support processing will be described with reference to FIGS. 12 and 16. The CPU 92 of the lens device 70 determines whether or not the image shift command transmitted from the CPU 42 of the surveillance camera body 20 is received by the transmission/reception interface (not shown) of the lens device 70, and executes the shift processing shown in FIG. 16 in a case in which an affirmative determination is made.

In step ST120, first, the acquisition unit 150 acquires the image shift command transmitted from the CPU 42 of the surveillance camera body 20. In addition, in step ST122, the acquisition unit 150 acquires the frame period information transmitted from the CPU 42 of the surveillance camera body 20. Furthermore, in step ST124, the acquisition unit 150 acquires the filter designation information stored in the RAM 96. Also, the acquisition unit 150 acquires the position detection result by the sixth position sensor 144.

In next step ST126, the shift amount calculation unit 158 decides the operation direction of the sixth motor 128 for each frame period based on the shift direction of the image indicated by the image shift command, the frame period indicated by the frame period information, and the position detection result by the sixth position sensor 144. The operation direction of the sixth motor 128 is decided based on the shift direction of the image indicated by the image shift command and the position detection result by the sixth position sensor 144. In addition, the shift amount calculation unit 158 calculates the operation amount of the sixth motor 128 for each frame period based on the shift amount of the image indicated by the image shift command, the frame period indicated by the frame period information, and the position detection result by the sixth position sensor 144.

In this case, the shift amount calculation unit 158 calculates the operation amount corresponding to the optical filter designated by the filter designation information for the operation amount of the sixth motor 128 that shifts the image. For example, in a case in which the optical filter designated by the filter designation information is the Ir cut filter 86, the shift amount calculation unit 158 calculates the operation amount corresponding to the Ir cut filter 86 based on the shift amount of the image indicated by the image shift command. In addition, in a case in which the optical filter designated by the filter designation information is the BPF 88, the shift amount calculation unit 158 calculates the operation amount corresponding to the BPF 88 based on the shift amount of the image indicated by the image shift command. In other words, the shift sensitivity of the shift lens 82 is changed in a case in which the wavelength range of the light transmitted through the shift lens 82 is changed, but even in a case in which the wavelength range of the light transmitted through the shift lens 82 is changed, the shift amount calculation unit 158 calculates the operation amount for shifting the image to the position corresponding to the shift amount of the image indicated by the image shift command.

In next step ST128, the shift control unit 160 generates, for each frame period, the control command according to the operation direction of the sixth motor 128 decided by the shift amount calculation unit 158 and the operation amount of the sixth motor 128 calculated by the shift amount calculation unit 158. The control command is output to the sixth motor driver 112.

The sixth motor driver 112 generates the operation signal based on the control command generated by the shift control unit 160. The operation signal is a pulse wave, for example. A period of the operation signal is synchronized with the frame period defined by the frame period information. The sixth motor 128 is operated by the operation amount according to the operation signal. As a result, the shift lens 82 is moved in the direction for shifting the image for each frame period, by applying the power to the shift lens 82. Specifically, the shift lens 82 is moved by the movement amount A2 corresponding to the Ir cut filter 86 in a case in which the optical filter designated by the filter designation information is the Ir cut filter 86, and the shift lens 82 is moved by the movement amount A2 corresponding to the BPF 88 in a case in which the optical filter designated by the filter designation information is the BPF 88.

As described above, the shift control unit 160 performs, with respect to the sixth motor 128, control of changing the movement amount A2 of the shift lens 82 based on the wavelength range of the light transmitted through the shift lens 82. Therefore, even in a case in which the wavelength range of the light transmitted through the shake correction lens 80 is changed, the influence of the change in the shift sensitivity of the shift lens 82 is suppressed, and the image is shifted to the position corresponding to the shift amount of the image indicated by the image shift command.

Figure 14:
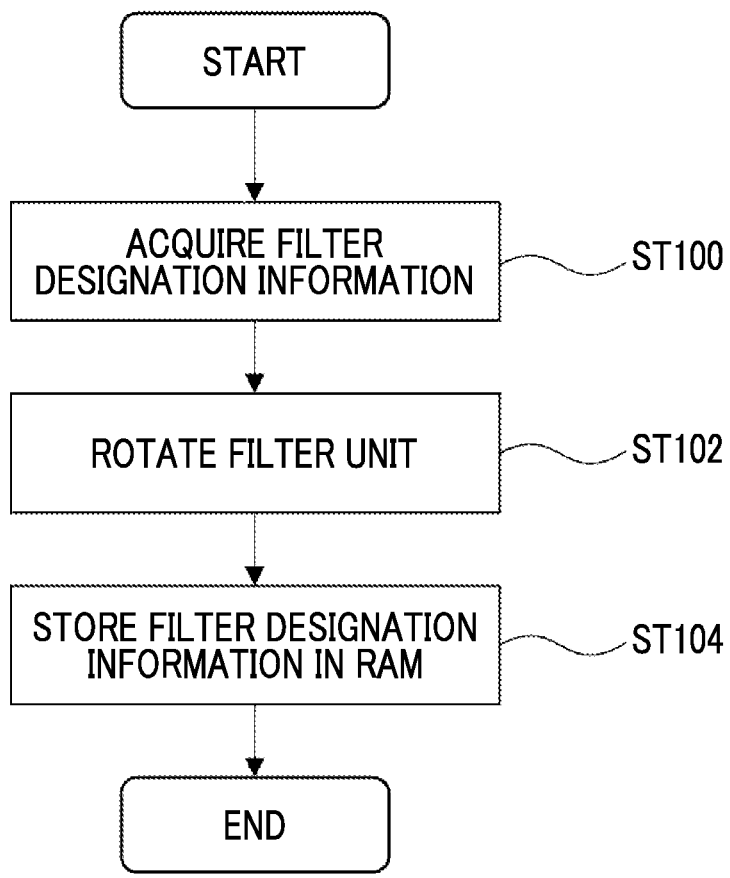
FIG. 14 is a flowchart showing an example of a flow of the filter change processing according to the embodiment of the technology of the present disclosure.
Figure 15:
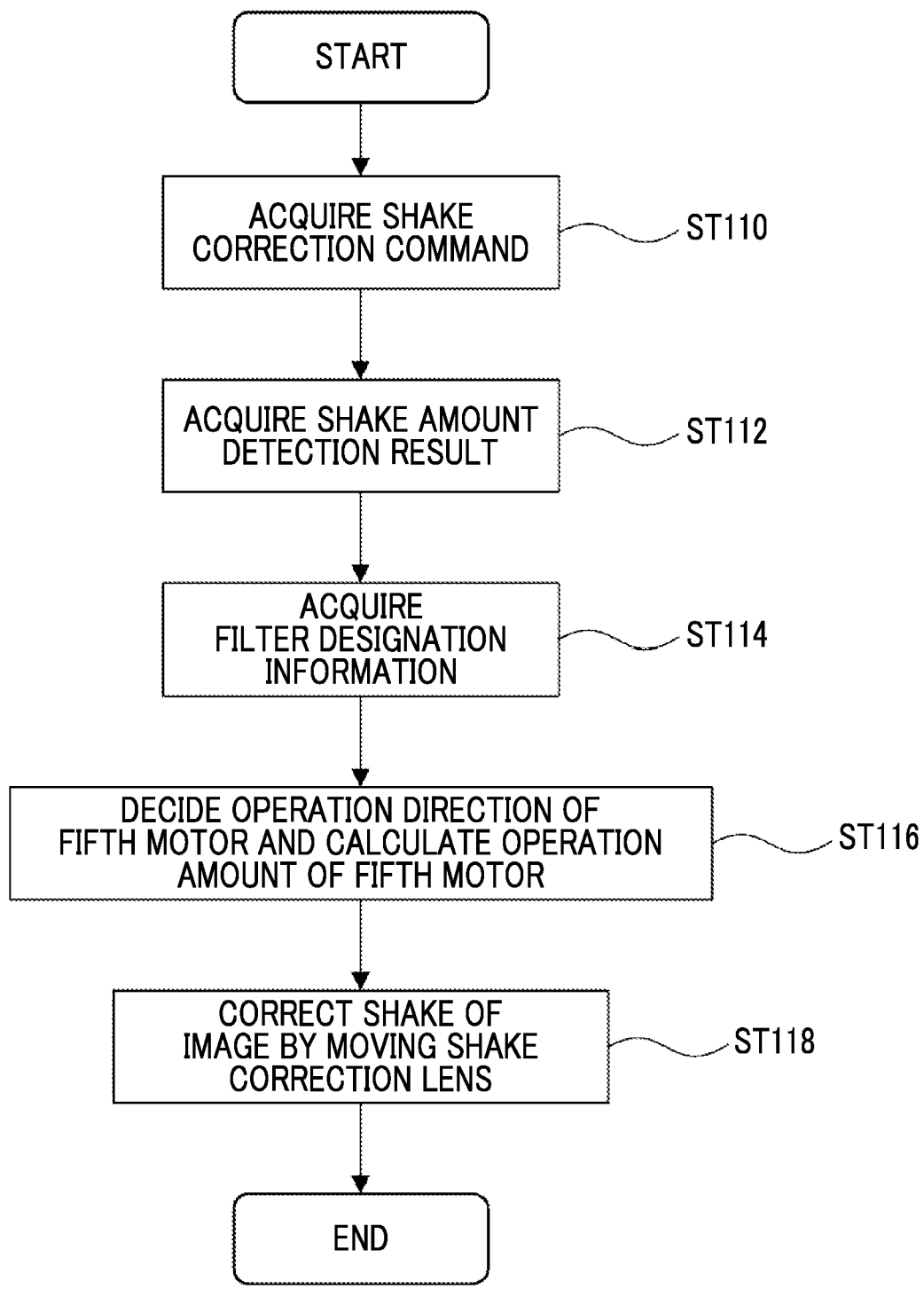
FIG. 15 is a flowchart showing an example of a flow of the shake correction processing according to the embodiment of the technology of the present disclosure.
Figure 16:
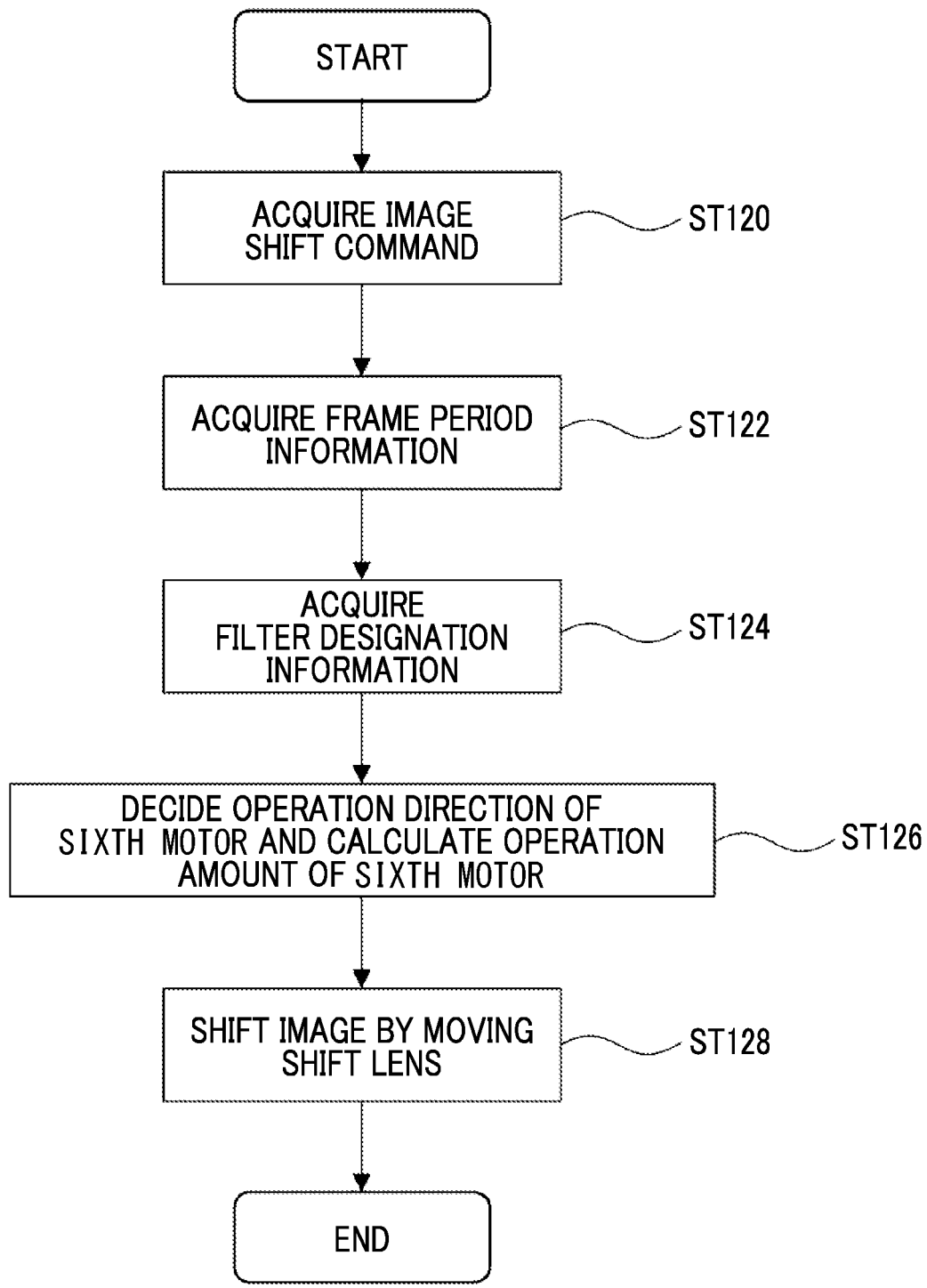
FIG. 16 is a flowchart showing an example of a flow of the shift processing according to the embodiment of the technology of the present disclosure.

It should be noted that the operation method the surveillance camera 10 described with reference to FIGS. 14, 15, and 16 is an example of an "operation method for an imaging apparatus" according to the technology of the present disclosure. In addition, the operation method the lens device 70 included in the operation method the surveillance camera 10 described with reference to FIGS. 14, 15, and 16 is an example of an "operation method for the lens device" according to the technology of the present disclosure.

Hereinafter, an effect of the surveillance camera 10 according to the present embodiment will be described.

As shown in FIG. 6, in the lens device 70, the shake correction lens 80 for correcting the shake of the image and the shift lens 82 for shifting the image along the light-receiving surface 24A of the image sensor 24 are separately provided. Therefore, for example, as compared with a case in which both the shake correction lens 80 performs both the correction of the shake of the image and the shift of the image using a common motor, it is possible to easily perform the control with respect to the fifth motor 126 that moves the shake correction lens 80 and the control with respect to the sixth motor 128 that moves the shift lens 82.

In addition, since the fifth motor 126 that moves the shake correction lens 80 and the sixth motor 128 that moves the shift lens 82 are separately provided, the weight can be distributed to the fifth motor 126 and the sixth motor 128 as compared with a case in which the shake correction lens 80 that performs both the correction of the shake of the image and the shift of the image is moved by the common motor.

In addition, as shown in FIG. 11, in the CPU 92 of the lens device 70 performs, with respect to the fifth motor 126, control of changing the movement amount A1 of the shake correction lens 80 based on the wavelength range of the light transmitted through the shake correction lens 80. Therefore, even in a case in which the wavelength range of the light transmitted through the shake correction lens 80 is changed, the influence of the change in the shake correction sensitivity of the shake correction lens 80 is suppressed, and the shake correction amount B1 proportional to the detection result by the shake amount detection sensor 56 can be obtained.

In addition, as shown in FIG. 12, the CPU 92 of the lens device 70 performs, with respect to the sixth motor 128, control of changing the movement amount A2 of the shift lens 82 based on the wavelength range of the light transmitted through the shift lens 82. Therefore, even in a case in which the wavelength range of the light transmitted through the shake correction lens 80 is changed, the influence of the change in the shift sensitivity of the shift lens 82 is suppressed, and the image can be shifted to the position corresponding to the shift amount of the image indicated by the image shift command.

In addition, as shown in FIG. 7, the shift sensitivity of the shift lens 82 is lower than the shake correction sensitivity of the shake correction lens 80. In other words, the shift amount B2 of the image on the light-receiving surface 24A of the image sensor 24 with respect to the movement of the shift lens 82 in the unit movement amount A is smaller than the shake correction amount B1 of the image on the light-receiving surface 24A of the image sensor 24 with respect to the movement of the shake correction lens 80 in the unit movement amount A. Therefore, for example, it is possible to reduce an error of the shift amount of the image with respect to an error of the movement amount of the shift lens 82 as compared with a case in which the shift sensitivity of the shift lens 82 is higher than the shake correction sensitivity of the shake correction lens 80.

In addition, as shown in FIG. 8, in a case in which the shift amount of the central ray F1 passing through the shift lens 82 after the movement on the optical axis OA on the light-receiving surface 24A of the image sensor 24 with respect to the movement of the shift lens 82 in the unit movement amount A is denoted by S1, and the shift amount of the peripheral ray F2 passing through the shift lens 82 after the movement on a region other than the optical axis OA on the light-receiving surface 24A of the image sensor 24 with respect to the movement of the shift lens 82 in the unit movement amount A is denoted by S2, the relationship of $0.8 \leq S2/S1 \leq 1.2$ is established. Here, in a case in which the value of S2/S1 is outside the defined range described above, that is, in a case in which $S2/S1 < 0.8$ or in a case in which $1.2 < S2/S1$, the continuity of image pixel values of the captured image obtained by being captured by the image sensor 24 is lost, the boundary portion of the image pixels is unnatural (for example, jagged), and the image quality of the captured image is outside the allowable range. In addition, in a case in which the image processing, such as edge enhancement, is applied to the captured image, the image processing is not performed well and the resolution of the captured image is lowered. On the other hand, in a case in which the relationship of $0.8 \leq S2/S1 \leq 1.2$ is established, the image quality of the captured image can be within the allowable range. In addition, the resolution of the captured image can be improved as compared with a case in which the value of S2/S1 is outside the defined range described above.

In addition, as shown in FIG. 2, the shake correction lens 80 and the shift lens 82 are disposed on the image sensor 24 side with respect to the zoom lens 74. Here, in a case in which the shake correction lens 80 and the shift lens 82 are disposed on the subject side with respect to the zoom lens 74, the light transmitted through the shake correction lens 80 and the shift lens 82 is imaged on the image sensor 24 via the zoom lens 74, so that the shake correction sensitivity of the shake correction lens 80 and the shift sensitivity of the shift lens 82 are changed as the zoom lens 74 is moved in the Z axis direction. Therefore, in a case in which the zoom lens 74 is moved in the Z axis direction, it is necessary to perform control of adjusting the movement amount A1 of the shake correction lens 80 and the movement amount A2 of the shift lens 82 as the zoom lens 74 is moved in the Z axis direction, but such control is complicated. On the other hand, in a case in which the shake correction lens 80 and the shift lens 82 are disposed on the image sensor 24 side with respect to the zoom lens 74, it can be not necessary to perform the control of adjusting the movement amount A1 of the shake correction lens 80 and the movement amount A2 of the shift lens 82 as the zoom lens 74 is moved in the Z axis direction.

In addition, since the shake correction lens 80 and the shift lens 82 are disposed on the image sensor 24 side with respect to the zoom lens 74, the diameter of each of the shake correction lens 80 and the shift lens 82 can be reduced as compared with a case in which the shake correction lens 80 and the shift lens 82 are disposed on the image sensor 24 side with respect to the zoom lens 74.

In addition, by reducing the diameter of each of the shake correction lens 80 and the shift lens 82, the weight of each of the shake correction lens 80 and the shift lens 82 can be reduced. As a result, it is possible to reduce a drive load of the fifth motor 126 that moves the shake correction lens 80 and a drive load of the sixth motor 128 that moves the shift lens 82.

In addition, as shown in FIG. 3, the filter unit 78 of the lens device 70 comprises the plurality of BPFs 88. The filter unit 78 is disposed on the subject side with respect to the image sensor 24, and each of the plurality of BPFs 88 transmits the near-infrared light included in the light. Therefore, the near-infrared light image can be obtained by imaging the near-infrared light on the image sensor 24.

In addition, as shown in FIG. 12, the CPU 92 of the lens device 70 performs, with respect to the sixth motor 128, control of moving the shift lens 82 to the position at which the image is shifted by the pitch equal to or larger than the pixel pitch of the image sensor 24 or the pitch smaller than the pixel pitch of the image sensor 24. Therefore, as shown in FIG. 13, the composite image 164 can be obtained by combining the obtained images 162 of the plurality of frames.

In addition, the shake correction lens 80 and the shift lens 82 are disposed on the image sensor 24 side with respect to the focus lens 72. Here, in a case in which the shake correction lens 80 and the shift lens 82 are disposed on the subject side with respect to the focus lens 72, the light transmitted through the shake correction lens 80 and the shift lens 82 is imaged on the image sensor 24 via the focus lens 72, so that the shake correction sensitivity of the shake correction lens 80 and the shift sensitivity of the shift lens 82 are changed as the focus lens 72 is moved in the Z axis direction. Therefore, in a case in which the focus lens 72 is moved in the Z axis direction, it is necessary to perform the control of adjusting the movement amount A1 of the shake correction lens 80 and the movement amount A2 of the shift lens 82 as the focus lens 72 is moved in the Z axis direction, but such control is complicated. On the other hand, in a case in which the shake correction lens 80 and the shift lens 82 are disposed on the image sensor 24 side with respect to the focus lens 72, it can be not necessary to perform the control of adjusting the movement amount A1 of the shake correction lens 80 and the movement amount A2 of the shift lens 82 as the focus lens 72 is moved in the Z axis direction.

In addition, the shake correction lens 80 and the shift lens 82 are disposed on the image sensor 24 side with respect to the stop 76. Here, in a case in which the shake correction lens 80 and the shift lens 82 are disposed between the stop 76 and the zoom lens 74, the fifth sliding mechanism (not shown) that supports the shake correction lens 80 to be slidable along the X-Y coordinate plane and the sixth sliding mechanism (not shown) that supports the shift lens 82 to be slidable along the X-Y coordinate plane are disposed to be adjacent to each other with respect to the second sliding mechanism (not shown) that supports the zoom lens 74 to be movable in the Z axis direction, so that the structure of the lens device 70 is complicated. Therefore, as the structure of the lens device 70 is complicated, there is a risk that the movement accuracy of the shake correction lens 80 and the movement accuracy of the shift lens 82 are lowered. On the other hand, in a case in which the shake correction lens 80 and the shift lens 82 are disposed on the image sensor 24 side with respect to the stop 76, it is possible to improve the movement accuracy of the shake correction lens 80 and the movement accuracy of the shift lens 82 as compared with a case in which the shake correction lens 80 and the shift lens 82 are disposed between the stop 76 and the zoom lens 74.

In addition, the lens device 70 comprises the shake correction lens 80 and the filter unit 78 that switches the wavelength range of the light transmitted through the shift lens 82. Therefore, for example, it is possible to easily switch the wavelength range of the light transmitted through the shake correction lens 80 and the shift lens 82 as compared with a case in which one optical filter among the plurality of optical filters is selectively mounted on the lens device 70 in order to change the wavelength range of the light transmitted through the shake correction lens 80 and the shift lens 82.

Hereinafter, a modification example of the surveillance camera 10 according to the present embodiment will be described.

In the embodiment described above, the CPU 92 of the lens device 70 performs both controls of the control of changing the movement amount A1 of the shake correction lens 80 and the control of changing the movement amount A2 of the shift lens 82 based on the wavelength range of the light transmitted through the shake correction lens 80 and the shift lens 82. However, the CPU 92 of the lens device 70 may only perform any one control of the control of changing the movement amount A1 of the shake correction lens 80 or the control of changing the movement amount A2 of the shift lens 82.

In addition, in the embodiment described above, in order to change the wavelength range of the light transmitted through the shake correction lens 80 and the shift lens 82, a rotation type filter unit 78 is used in which the plurality of optical filters are arranged in an annular shape and the optical filter disposed on the optical axis OA among the plurality of optical filters is switched by the rotation. However, for example, a slide type filter unit may be used in which the plurality of optical filters are linearly arranged and the optical filter disposed on the optical axis OA among the plurality of optical filters is switched by sliding. In addition, in order to change the wavelength range of the light transmitted through the shake correction lens 80 and the shift lens 82, one optical filter among the plurality of optical filters may be selectively mounted on the lens device 70.

In addition, the control of changing the movement amount A1 of the shake correction lens 80 based on the wavelength range of the light transmitted through the shake correction lens 80 is not limited to the aspect described above, and various aspects other than the aspect described above can be adopted. Similarly, the control of changing the movement amount A2 of the shift lens 82 based on the wavelength range of the light transmitted through the shift lens 82 is not limited to the aspect described above, and various aspects other than the aspect described above can be adopted.

Figure 17:
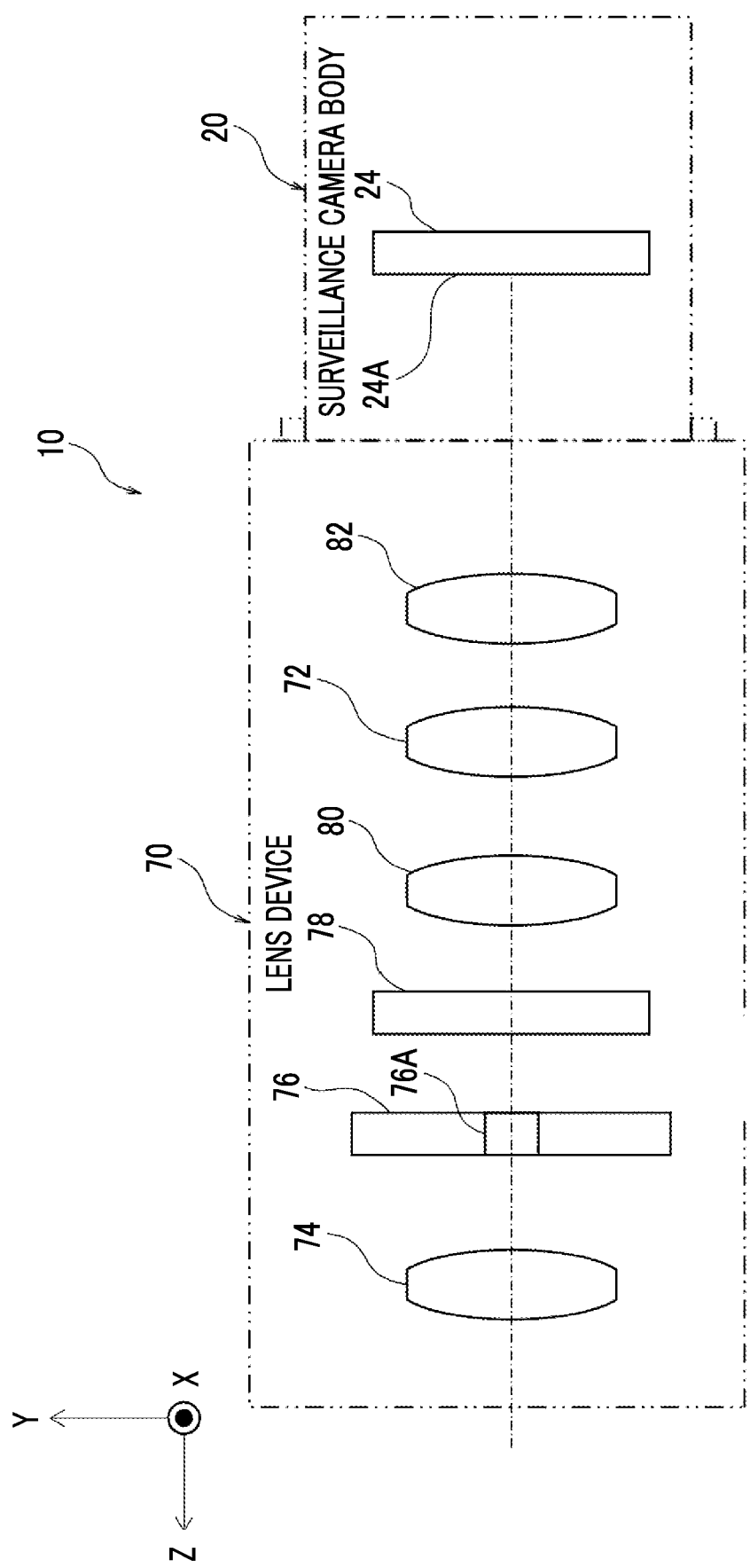
FIG. 17 is a side view showing an example of a configuration of an optical system of a surveillance camera according to a first modification example.

In addition, in the embodiment described above, the focus lens 72, the zoom lens 74, the stop 76, the filter unit 78, the shake correction lens 80, and the shift lens 82 are disposed in order along the optical axis OA from the subject side to the image side, but as shown in FIG. 17 as an example, the zoom lens 74, the stop 76, the filter unit 78, the shake correction lens 80, the focus lens 72, and the shift lens 82 may be disposed in order along the optical axis OA from the subject side to the image side.

In addition, the arrangement order of the focus lens 72, the zoom lens 74, the stop 76, the filter unit 78, the shake correction lens 80, and the shift lens 82 may be the arrangement order other than the order shown in FIG. 2 and the order shown in FIG. 17.

Figure 18:
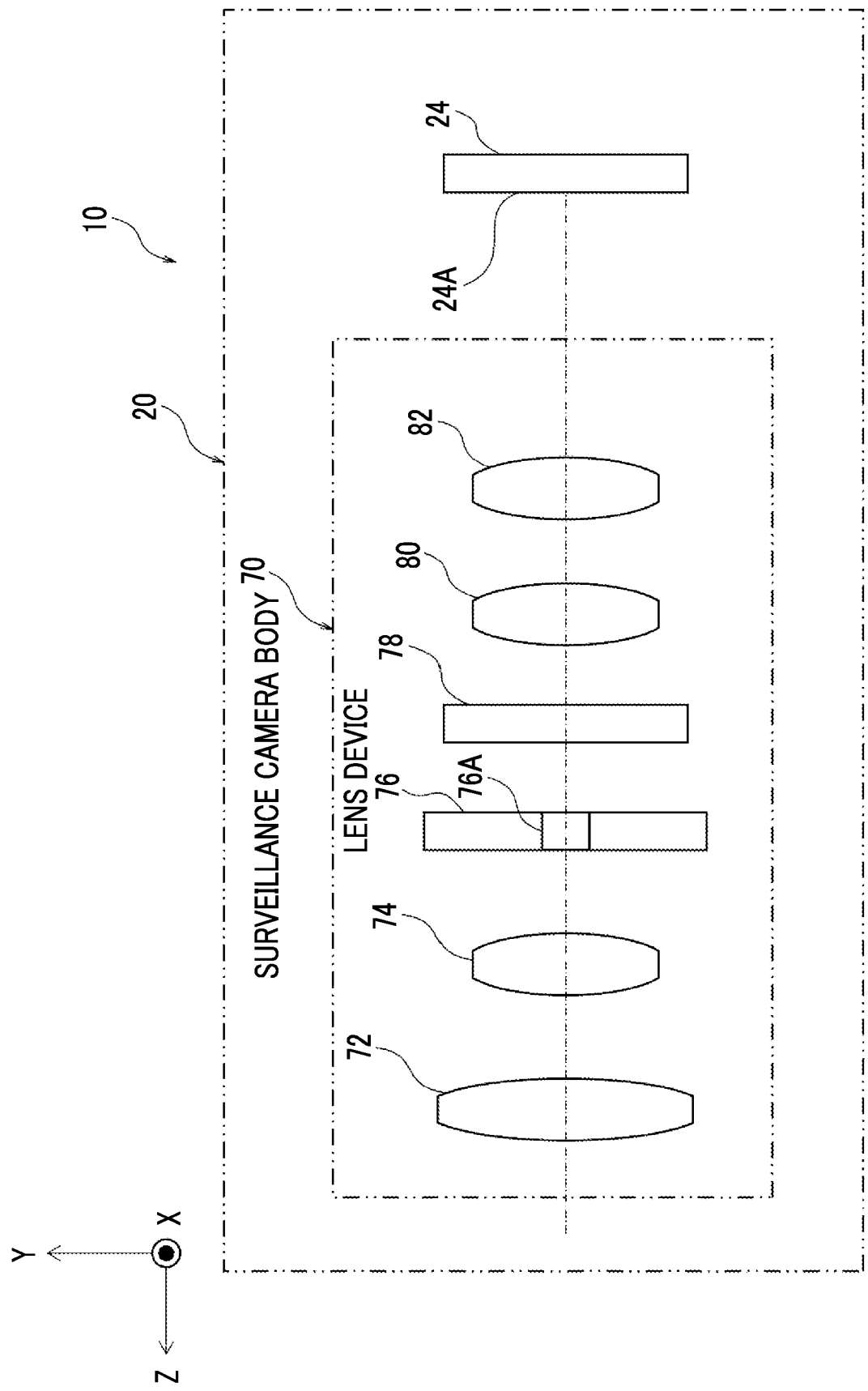
FIG. 18 is a side view showing an example of a configuration of an optical system of a surveillance camera according to a second modification example.

In addition, in the embodiment described above, the lens device 70 is provided on the surveillance camera body 20 by mounting the lens device 70 on the surveillance camera body 20 including the image sensor 24, but as shown in FIG. 18 as an example, the lens device 70 may be provided on the surveillance camera body 20 by mounting the lens device 70 on the surveillance camera body 20 including the image sensor 24.

Also, the surveillance camera 10 may be configured as follows. That is, in the modification example of the surveillance camera 10 shown in FIG. 19 as an example, the lens device 70 comprises a first optical system 202, a second optical system 204, a color separation prism 206, a third optical system 208, and a fourth optical system 210. In addition, the surveillance camera body 20 comprises a first image sensor 214 and a second image sensor 216. The color separation prism 206 is an example of a "light separation mechanism" according to the technology of the present disclosure, and the first image sensor 214 and the second image sensor 216 are examples of an "image sensor" according to the technology of the present disclosure.

The first optical system 202 includes a plurality of lenses 218, 220, 222, and 224, and a first stop 230. The second optical system 204 is disposed between the first optical system 202 and the color separation prism 206. The second optical system 204 includes a lens 228. The color separation prism 206 separates the light into first light G1 and second light G2. For example, the first light G1 is the infrared light and the second light G2 is the visible light. The optical axis OA is branched into a first optical axis OAa and a second optical axis OAb by the color separation prism 206.

The third optical system 208 is disposed between the color separation prism 206 and the first image sensor 214. The third optical system 208 includes a first filter unit 231 and a first shake correction lens 232, and a first shift lens 234. Similarly to the shake correction lens 80 (see FIG. 6), the first shake correction lens 232 is moved along the X-Y coordinate plane by applying the power by the first drive mechanism (not shown). Similarly to the shift lens 82 (see FIG. 6), the first shift lens 234 moves along the X-Y coordinate plane by applying the power by a second drive mechanism (not shown). The first shake correction lens 232 and the first shift lens 234 are examples of a "first optical lens" and the "movement lens" according to the technology of the present disclosure, respectively.

The fourth optical system 210 is disposed between the color separation prism 206 and the second image sensor 216. The fourth optical system 210 includes a second stop 236, a second filter unit 238, a second shake correction lens 240, and a second shift lens 242. Similarly to the shake correction lens 80 (see FIG. 6), the second shake correction lens 240 is moved along an X-Z coordinate plane by applying the power by a third drive mechanism (not shown). Similarly to the shift lens 82 (see FIG. 6), the second shift lens 242 is moved along the X-Z coordinate plane by applying the power by a fourth drive mechanism (not shown). The second shake correction lens 240 and the second shift lens 242 are examples of a "second optical lens" and the "movement lens" according to the technology of the present disclosure, respectively.

The first light G1 transmitted through the first shake correction lens 232 and the first shift lens 234 is imaged on a light-receiving surface 214A of the first image sensor 214, the second light G2 transmitted through the second shake correction lens 240 and the second shift lens 242 is imaged on a light-receiving surface 216A of the second image sensor 216.

Figure 19:
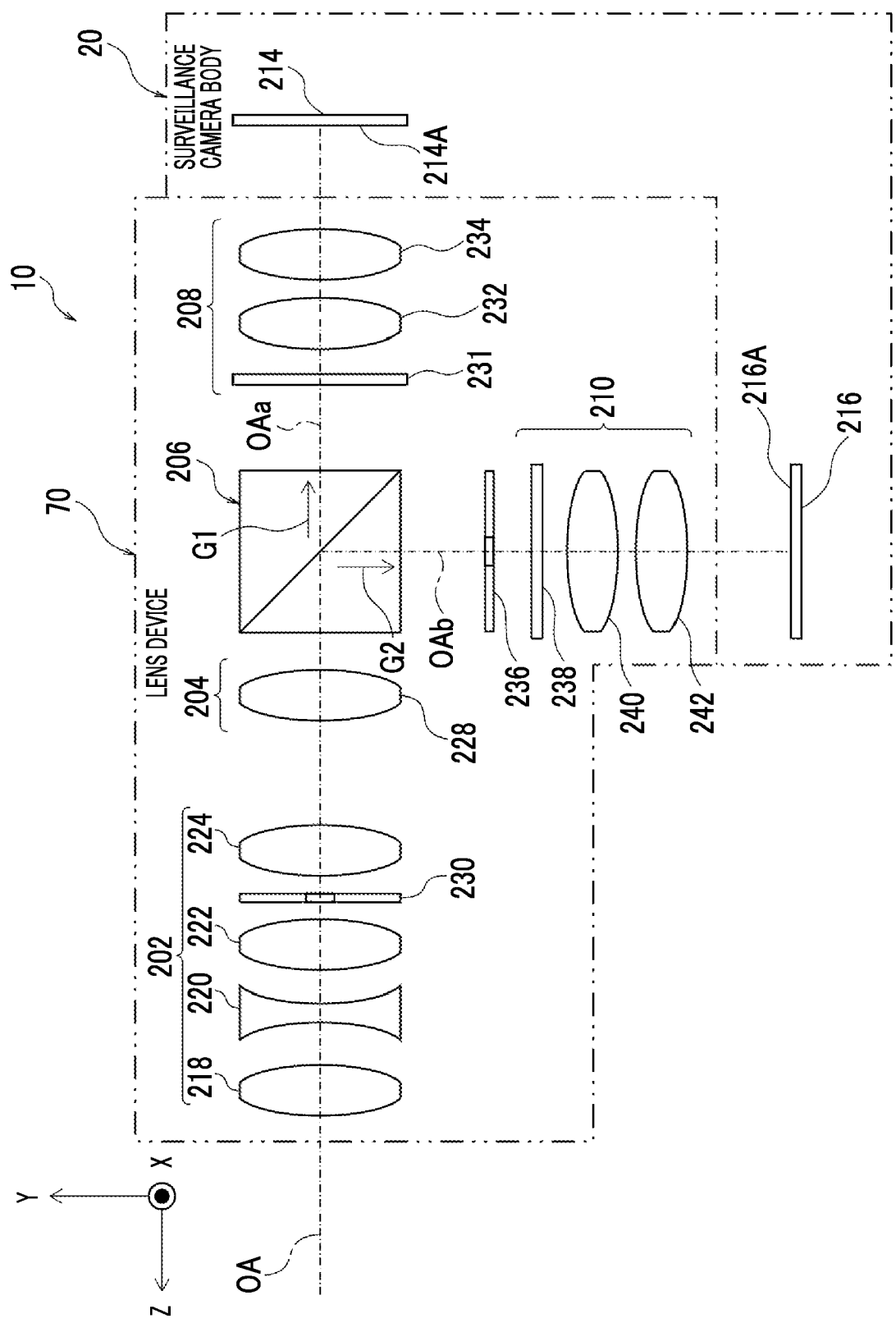
FIG. 19 is a side view showing an example of a configuration of an optical system of a surveillance camera according to a third modification example.

In the modification example shown in FIG. 19, as in the embodiment described above, control of changing a movement amount of the first shake correction lens 232 and control of changing a movement amount of the first shift lens 234 are performed, respectively, based on a wavelength range of the first light G1 transmitted through the first shake correction lens 232 and the first shift lens 234. In addition, in the modification example shown in FIG. 19, as in the embodiment described above, control of changing a movement amount of the second shake correction lens 240 and control of changing a movement amount of the second shift lens 242 are performed, respectively, based on a wavelength range of the second light G2 transmitted through the second shake correction lens 240 and the second shift lens 242.

It should be noted that, in the modification example shown in FIG. 19, any one of a combination of the control of changing the movement amount of the first shake correction lens 232 and the control of changing the movement amount of the first shift lens 234 or a combination of the control of changing the movement amount of the second shake correction lens 240 and the control of changing the movement amount of the second shift lens 242 may only be performed.

In addition, in the modification example shown in FIG. 19, any one of the control of changing the movement amount of the first shake correction lens 232 or the control of changing the movement amount of the first shift lens 234 may only be performed. In addition, in the modification example shown in FIG. 19, any one of the control of changing the movement amount of the second shake correction lens 240 or the control of changing the movement amount of the second shift lens 242 may only be performed.

In addition, in the modification example shown in FIG. 19, one of the first shake correction lens 232 or the first shift lens 234 may be a stationary lens. Similarly, one of the second shake correction lens 240 or the second shift lens 242 may be a stationary lens.

In addition, in the embodiment described above, the lens device 70 comprises the controller 90 different from the controller 40 of the surveillance camera body 20, but the lens device 70 does not have to comprise the controller 90. Moreover, the functions of the controller 90 of the lens device 70 may be integrated into the controller 40 of the surveillance camera body 20, and the control of the lens device 70 may be performed by the controller 40 of the surveillance camera body 20. In this case, the controller 90 is an example of a "computer applied to an imaging apparatus".

In addition, in the embodiment described above, the form example is described in which the imaging processing is executed by the controller 40 of the surveillance camera 10, but the technology of the present disclosure is not limited to this. For example, the imaging processing may be executed by a computer of an external device that is connected to the surveillance camera 10 via a network, such as a LAN or a WAN, in a communicable manner. In addition, the external device described above and the surveillance camera 10 may execute the imaging processing in a distributed manner, or a plurality of devices including the external device described above and the surveillance camera 10 may execute the imaging processing in a distributed manner.

In addition, in the embodiment described above, the surveillance camera 10 is described as an example of the imaging apparatus, but the technology of the present disclosure is not limited to this, and the technology shown in the embodiment described above can be applied to various imaging apparatuses. Examples of the imaging apparatus described herein include a digital camera that is a lens interchangeable type and does not use a reflex mirror, a digital camera that is a lens stationary type, a digital camera that uses a reflex mirror, and a digital camera built in various electronic apparatuses, such as a smart device, a wearable terminal, and a cell observation device, an ophthalmology observation device, and a surgical microscope. In addition, the technology shown in the embodiment described above may be applied to an imaging apparatus comprising an image sensor having sensitivity to light having a wavelength range other than a wavelength range of the near-infrared light.

In addition, in the embodiment described above, the form example is described in which the imaging support processing program 100 is stored in the NVM 94, but the imaging support processing program 100 may be stored in a portable storage medium, such as an SSD or a USB memory, and the imaging support processing program 100 need only be stored in a non-transitory storage medium. The imaging support processing program 100 stored in the non-transitory storage medium is installed and used in the lens device 70, for example.

In addition, in the embodiment described above, the aspect example is shown in which the controller 40 is built in the surveillance camera 10, but the technology of the present disclosure is not limited to this, and for example, the controller 40 may be provided in the outside of the surveillance camera 10.

In addition, in the embodiment described above, the CPU 42 of the surveillance camera body 20 is a single CPU, but may be a plurality of CPUs. In addition, a GPU may be applied instead of the CPU 42. Similarly, the CPU 92 of the lens device 70 is a single CPU, but may be a plurality of CPUs. In addition, a GPU may be applied instead of the CPU 92.

In addition, in the embodiment described above, the surveillance camera body 20 comprises the controller 40, but the technology of the present disclosure is not limited to this, and a device including an ASIC, an FPGA, and/or a PLD may be applied instead of the controller 40. In addition, a hardware configuration and a software configuration may be used in combination, instead of the controller 40.

In addition, in the embodiment described above, the lens device 70 comprises the controller 90, but the technology of the present disclosure is not limited to this, and a device including an ASIC, an FPGA, and/or a PLD may be applied instead of the controller 90. In addition, a hardware configuration and a software configuration may be used in combination, instead of the controller 90.

The following various processors can be used as a hardware resource for executing the imaging support processing in the embodiment described above. Examples of the processor include a CPU which is a general-purpose processor functioning as the hardware resource for executing the imaging support processing by executing software, that is, a program. Examples of the processor also include a dedicated electric circuit which is a processor having a circuit configuration specially designed for executing specific processing, such as an FPGA, a PLD, or an ASIC. A memory is also built in or connected to any processor, and any processor executes the imaging support processing using the memory.

The hardware resource for executing the imaging support processing may be configured by one of these various processors, or may be configured by a combination of two or more processors of the same type or different types (for example, a combination of a plurality of FPGAs or a combination of a CPU and an FPGA). Moreover, the hardware resource for executing the imaging support processing may be one processor.

As an example of the configuration using one processor, first, there is a form in which one processor is configured by a combination of one or more CPUs and software, and the processor functions as the hardware resource for executing the imaging support processing. Secondly, as represented by the SoC, there is a form in which a processor that realizes the functions of the entire system including a plurality of hardware resources for executing the imaging support processing with one IC chip is used. In this way, the imaging support processing is realized by using one or more of the various processors described above as the hardware resource.

Further, more specifically, an electric circuit in which circuit elements, such as semiconductor elements, are combined can be used as the hardware structure of these various processors. Moreover, the imaging support processing is merely an example. Accordingly, it is obvious that unnecessary steps may be deleted, new steps may be added, or the processing sequence may be changed within a range that does not deviate from the gist.

The contents described and shown so far are the detailed description of the parts according to the technology of the present disclosure, and are merely examples of the technology of the present disclosure. For example, the descriptions of the configurations, the functions, the actions, and the effects are the descriptions of examples of the configurations, the functions, the actions, and the effects of the parts according to the technology of the present disclosure. It is needless to say that unnecessary parts may be deleted, new elements may be added, or replacements may be made with respect to the contents described and shown so far within a range that does not deviate from the gist of the technology of the present disclosure. In addition, in order to avoid complications and facilitate understanding of the parts according to the technology of the present disclosure, in the contents described and shown so far, the descriptions of common technical knowledge and the like that do not particularly require the description for enabling carrying out of the technology of the present disclosure are omitted.

In the present specification, "A and/or B" is synonymous with "at least one of A or B". In other words, "A and/or B" means that it may be only A, only B, or a combination of A and B. In addition, in the present specification, in a case in which three or more matters are associated and expressed by "and/or", the same concept as "A and/or B" is applied.

All of the documents, the patent applications, and the technical standards described in the present specification are incorporated into the present specification by reference to the same extent as in a case in which the individual documents, patent applications, and technical standards are specifically and individually stated to be described by reference.

What is claimed is:

1. A lens device provided in an imaging apparatus body including an image sensor, the lens device comprising:
   a processor;
   a memory coupled to or integrated with the processor;
   a lens that includes a movement lens and that images incident light on the image sensor; and
   a drive mechanism that moves the movement lens by applying power to the movement lens along a coordinate plane intersecting an optical axis of the lens,
   wherein the movement lens includes at least one of a shake correction lens moving in a direction in which a shake of an image obtained by imaging the light on the image sensor is corrected, and a shift lens moving to a position at which the image is shifted,
   wherein the processor is configured to perform, with respect to the drive mechanism, control of changing at least one of a movement amount of the shake correction lens and a movement amount of the shift lens, based on a wavelength range of the light transmitted through the movement lens.

2. The lens device according to claim 1,
   wherein the movement lens includes the shake correction lens and the shift lens,
   wherein the drive mechanism includes:
   a first drive mechanism that moves the shake correction lens along the coordinate plane; and
   a second drive mechanism that moves the shift lens along the coordinate plane.

3. The lens device according to claim 2,
   wherein the processor is configured to:
   perform, with respect to the first drive mechanism, control of moving the shake correction lens in the direction in which the shake of the image is corrected, and
   perform, with respect to the second drive mechanism, control of moving the shift lens in the direction for shifting the image.

4. The lens device according to claim 3,
   wherein the processor is configured to perform, with respect to the second drive mechanism, control of moving the shift lens to the position at which the image is shifted at a pitch equal to or larger than a pixel pitch of the image sensor or a pitch smaller than the pixel pitch of the image sensor.

5. The lens device according to claim 3,
   wherein a shift amount of the image on a light-receiving surface of the image sensor with respect to movement of the shift lens in a unit movement amount is smaller than a shake correction amount of the image on the light-receiving surface of the image sensor with respect to movement of the shake correction lens in the unit movement amount.

6. The lens device according to claim 3,
   wherein, in a case in which a shift amount of a central ray passing through the shift lens, after movement on the optical axis on a light-receiving surface of the image sensor with respect to movement of the shift lens, in a unit movement amount is denoted by S1, and a shift amount of a peripheral ray passing through the shift lens, after movement on a region other than the optical axis on the light-receiving surface of the image sensor with respect to movement of the second lens in the unit movement amount, is denoted by S2,
   a relationship of $0.8 \leq S2/S1 \leq 1.2$ is established.

7. The lens device according to claim 2, further comprising:
   a zoom lens,
   wherein the shake correction lens and the shift lens are disposed on an image sensor side with respect to the zoom lens.

8. The lens device according to claim 2, further comprising:
   an optical filter that is disposed on a subject side with respect to the image sensor and transmits near-infrared light included in the light.

9. The lens device according to claim 2, further comprising:
   a focus lens,
   wherein the shake correction lens and the shift lens are disposed on an image sensor side with respect to the focus lens.

10. The lens device according to claim 2, further comprising:
    a stop,
    wherein the shake correction lens and the shift lens are disposed on an image sensor side with respect to the stop.

11. The lens device according to claim 1, further comprising:
    a switching mechanism that switches the wavelength range of the light transmitted through the movement lens.

12. The lens device according to claim 1, further comprising:
   a light separation mechanism that separates the light into first light and second light;
   a first optical lens through which the first light is transmitted; and
   a second optical lens through which the second light is transmitted,
   wherein at least one of the first optical lens or the second optical lens is the movement lens.

13. An imaging apparatus comprising:
   a processor;
   a memory coupled to or integrated with the processor;
   an image sensor;
   a lens that includes a movement lens and that images incident light on the image sensor; and
   a drive mechanism that moves the movement lens by applying power to the movement lens along a coordinate plane intersecting an optical axis of the lens,
   wherein the movement lens includes at least one of a shake correction lens moving in a direction in which a shake of an image obtained by imaging the light on the image sensor is corrected, and a shift lens moving to a position at which the image is shifted,
   wherein the processor is configured to perform, with respect to the drive mechanism, control of changing at least one of a movement amount of the shake correction lens and a movement amount of the shift lens, based on a wavelength range of the light transmitted through the movement lens.

14. The imaging apparatus according to claim 13,
   wherein the processor is configured to:
      perform, with respect to the drive mechanism, control of moving the shift lens to the position at which the image is shifted at a pitch equal to or larger than a pixel pitch of the image sensor or a pitch smaller than the pixel pitch of the image sensor,
      cause the image sensor to perform imaging each time the image is shifted, and
      combine images of a plurality of frames obtained by the imaging.

15. An operation method for a lens device comprising a lens that includes a movement lens and that images incident light on an image sensor of an imaging apparatus body, and a drive mechanism that moves the movement lens by applying power to the movement lens along a coordinate plane intersecting an optical axis of the lens, wherein the movement lens includes at least one of a shake correction lens moving in a direction in which a shake of an image obtained by imaging the light on the image sensor is corrected, and a shift lens moving to a position at which the image is shifted,
   the operation method comprising:
   performing, with respect to the drive mechanism, control of changing at least one of a movement amount of the shake correction lens and a movement amount of the shift lens, based on a wavelength range of the light transmitted through the movement lens.

16. An operation method for an imaging apparatus comprising an image sensor, a lens that includes a movement lens and that images incident light on the image sensor, and a drive mechanism that moves the movement lens by applying power to the movement lens along a coordinate plane intersecting an optical axis of the lens, wherein the movement lens includes at least one of a shake correction lens moving in a direction in which a shake of an image obtained by imaging the light on the image sensor is corrected, and a shift lens moving to a position at which the image is shifted,
   the operation method comprising:
   performing, with respect to the drive mechanism, control of changing at least one of a movement amount of the shake correction lens and a movement amount of the shift lens, based on a wavelength range of the light transmitted through the movement lens.

17. A non-transitory computer-readable storage medium storing a program that is executable by a computer applied to a lens device to perform a process,
   wherein the lens device comprises a lens that includes a movement lens and that images incident light on an image sensor of an imaging apparatus body, and a drive mechanism that moves the movement lens by applying power to the movement lens along a coordinate plane intersecting an optical axis of the lens, wherein the movement lens includes at least one of a shake correction lens moving in a direction in which a shake of an image obtained by imaging the light on the image sensor is corrected, and a shift lens moving to a position at which the image is shifted,
   the process comprising:
   performing, with respect to the drive mechanism, control of changing at least one of a movement amount of the shake correction lens and a movement amount of the shift lens, based on a wavelength range of the light transmitted through the movement lens.

18. A non-transitory computer-readable storage medium storing a program executable by a computer applied to an imaging apparatus to perform a process,
   wherein the imaging apparatus comprises an image sensor, a lens that includes a movement lens and that images incident light on the image sensor; and a drive mechanism that moves the movement lens by applying power to the movement lens along a coordinate plane intersecting an optical axis of the lens, wherein the movement lens includes at least one of a shake correction lens moving in a direction in which a shake of an image obtained by imaging the light on the image sensor is corrected, and a shift lens moving to a position at which the image is shifted,
   the process comprising:
   performing, with respect to the drive mechanism, control of changing at least one of a movement amount of the shake correction lens and a movement amount of the shift lens, based on a wavelength range of the light transmitted through the movement lens.

* * * * *